(12) United States Patent
Okamoto et al.

(10) Patent No.: US 10,913,222 B2
(45) Date of Patent: Feb. 9, 2021

(54) METHOD FOR PRODUCING COMPOSITE MATERIAL COMPONENT AND DEVICE FOR PRODUCING COMPOSITE MATERIAL COMPONENT

(71) Applicant: JAMCO CORPORATION, Tokyo (JP)

(72) Inventors: Makoto Okamoto, Tokyo (JP); Masato Ishii, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 16/617,600

(22) PCT Filed: Jun. 2, 2017

(86) PCT No.: PCT/JP2017/020583
§ 371 (c)(1),
(2) Date: Nov. 27, 2019

(87) PCT Pub. No.: WO2018/220814
PCT Pub. Date: Dec. 6, 2018

(65) Prior Publication Data
US 2020/0180243 A1    Jun. 11, 2020

(51) Int. Cl.
*B29C 70/54* (2006.01)
*B29C 70/46* (2006.01)
(Continued)

(52) U.S. Cl.
CPC ............. *B29C 70/54* (2013.01); *B29C 70/34* (2013.01); *B29C 70/462* (2013.01);
(Continued)

(58) Field of Classification Search
CPC ......... B29C 70/30; B29C 43/06; B29C 43/22; B29C 70/50; B29C 70/54; B29C 70/34
(Continued)

(56) References Cited

U.S. PATENT DOCUMENTS 1,553,554 A * 9/1925 Roberts ............... B29C 66/1312
156/145
4,290,248 A 9/1981 Kemerer
(Continued)

FOREIGN PATENT DOCUMENTS

JP    S51-135962 A    11/1976
JP    H6-18730 B2    3/1994
(Continued)

OTHER PUBLICATIONS

International Search Report (Form PCT/ISA/210) dated Aug. 29, 2017, issued in counterpart International Application No. PCT/JP2017/020583.
(Continued)

*Primary Examiner* — Philip C Tucker
*Assistant Examiner* — Jimmy R Smith, Jr.
(74) *Attorney, Agent, or Firm* — Renner, Otto, Boisselle & Sklar, LLP

(57) ABSTRACT

A composite material component manufacturing method includes a molding step of applying, by a pressing device, heat and pressure to a prepreg to mold the prepreg, and a transfer step of transferring the prepreg. The transfer step includes moving the prepreg together with the pressing device in a state in which a pressing force is applied to the prepreg by the pressing device.

9 Claims, 25 Drawing Sheets

(51) Int. Cl.
  *B29C 70/34* (2006.01)
  *B29K 105/08* (2006.01)
  *B29L 31/30* (2006.01)

(52) U.S. Cl.
  CPC ............... *B29K 2105/0872* (2013.01); *B29L 2031/3055* (2013.01); *B29L 2031/3076* (2013.01)

(58) Field of Classification Search
  USPC .... 156/580, 581, 583.1, 411, 408, 358, 242; 264/239, 242, 248, 259
  See application file for complete search history.

(56) References Cited

U.S. PATENT DOCUMENTS

| | | | |
|---|---|---|---|
| 5,043,128 A | 8/1991 | Umeda | |
| 2001/0007684 A1 | 7/2001 | Kasai | |
| 2003/0130477 A1* | 7/2003 | Winckler | B29C 67/246 528/274 |
| 2005/0140045 A1* | 6/2005 | Okamoto | B29C 43/52 264/160 |
| 2010/0116421 A1 | 5/2010 | Kuriyama | |
| 2011/0048624 A1 | 3/2011 | Nitsch | |
| 2014/0251529 A1* | 9/2014 | Blot | B29C 70/50 156/196 |
| 2016/0368230 A1* | 12/2016 | Backhaus | B29C 33/40 |

FOREIGN PATENT DOCUMENTS

| | | |
|---|---|---|
| JP | H7-148850 A | 6/1995 |
| JP | 2001-191418 A | 7/2001 |
| JP | 2010-115822 A | 5/2010 |
| JP | 2011-513085 A | 4/2011 |
| JP | 2017-501057 A | 1/2017 |

OTHER PUBLICATIONS

Written Opinion (Form PCT/ISA/237) dated Aug. 29, 2017, issued in counterpart International Application No. PCT/JP2017/020583.
Decision to Grant for corresponding Japanese Application No. 2017-561980, dated Sep. 5, 2018.

* cited by examiner

METHOD FOR PRODUCING COMPOSITE MATERIAL COMPONENT AND DEVICE FOR PRODUCING COMPOSITE MATERIAL COMPONENT

TECHNICAL FIELD

The present invention relates to a composite material component manufacturing method and a composite material component manufacturing device.

Composite material components composed of fibers and resin are used in various products, such as aircraft and automobiles.

When an elongated composite material component is molded, a pultrusion molding method, an advanced pultrusion molding method (hereinafter referred to as an "ADP molding method") or the like is used. In pultrusion molding methods and ADP-molding methods, a prepreg sheet in which a thermosetting resin is impregnated in a continuous fiber such as a unidirectional fiber, a woven fabric, or the like is generally used.

As a related technique, Patent Document 1 describes a molding method of a plastic-based composite material. In the molding method of the plastic-based composite material described in Patent Document 1, when a plastic material that has been reinforced with fibers is heated and pressed for molding, the plastic material is intermittently heated and pressed, and the plastic material is transferred when the pressurization is released.

In addition, Patent Document 2 describes a continuous molding device for H-shaped members made of FRP. The continuous molding device for the FRP H-shaped members described in Patent Document 2 includes a pressing device for applying heat and pressure to a prepreg material, and a device for pulling and fixing the prepreg material. Furthermore, Patent Document 3 describes a continuous molding method of composite material profiles having different cross-sections. In the molding method described in Patent Document 3, a composite mold material whose cross section differs according to the position along the longitudinal direction (e.g., a composite mold material whose thickness dimension differs according to the position along the longitudinal direction) is molded by using a moving die whose outer surface dimension differs according to the position along the longitudinal direction.

CITATION LIST

Patent Literature

[Patent Document 1] Japanese Examined Patent Application Publication No. 6-18730
[Patent Document 2] Japanese Unexamined Patent Application Publication No. 2001-191418
[Patent Document 3] Japanese Unexamined Patent Application Publication No. 2010-115822

SUMMARY OF INVENTION

Technical Problem

In conventional pulling type molding methods (pultrusion molding method, ADP molding method, or the like), at the time of pulling, tension acts on the material softened by molding. For this reason, it has been difficult to use prepregs that use discontinuous fibers such as short fibers, or prepregs that use continuous fibers in which the fibers are not oriented in the 0 degree direction in pulling type molding methods.

It is therefore an object of the present invention to provide a composite material component manufacturing method and a composite material component manufacturing device capable of suppressing the effect of tension on a softened portion of a prepreg during transfer of the prepreg.

Solution to Problem

In order to achieve the above object, the composite material component manufacturing method according to the present invention includes a molding step of applying, by a pressing device, heat and pressure to a prepreg to mold the prepreg, and a transfer step of transferring the prepreg. The transfer step includes moving the prepreg together with the pressing device in a state in which a pressing force is applied to the prepreg by the pressing device.

In addition, the composite material component manufacturing device according to the present invention includes a pressing device configured to apply heat and pressure to a prepreg, and a prepreg transfer device configured to transfer the prepreg. The prepreg transfer device includes the pressing device. In addition, the prepreg transfer device transfers the prepreg by moving the pressing device.

Advantageous Effects of Invention

According to the present invention, it is possible to provide a composite material component manufacturing method and a composite material component manufacturing device capable of suppressing the effect of tension on a softened portion of a prepreg during transfer of the prepreg.

DESCRIPTION OF EMBODIMENT(S)

Figure 1:
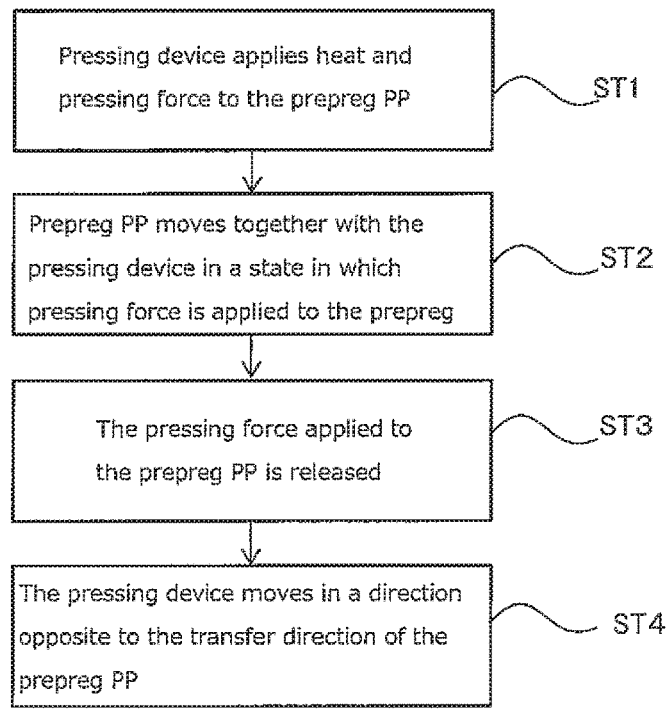
FIG. 1 is a flowchart illustrating an example of a composite material component manufacturing method according to a first embodiment.

Hereinafter, a composite material component manufacturing method and a composite material component manufacturing device 1 according to an embodiment will be described with reference to the drawings. It should be noted that in the following description of the embodiments, parts and members having the same functions are denoted by the same reference numerals, and redundant descriptions of parts and members denoted by the same reference numerals are omitted.

First Embodiment

Figure 2A:
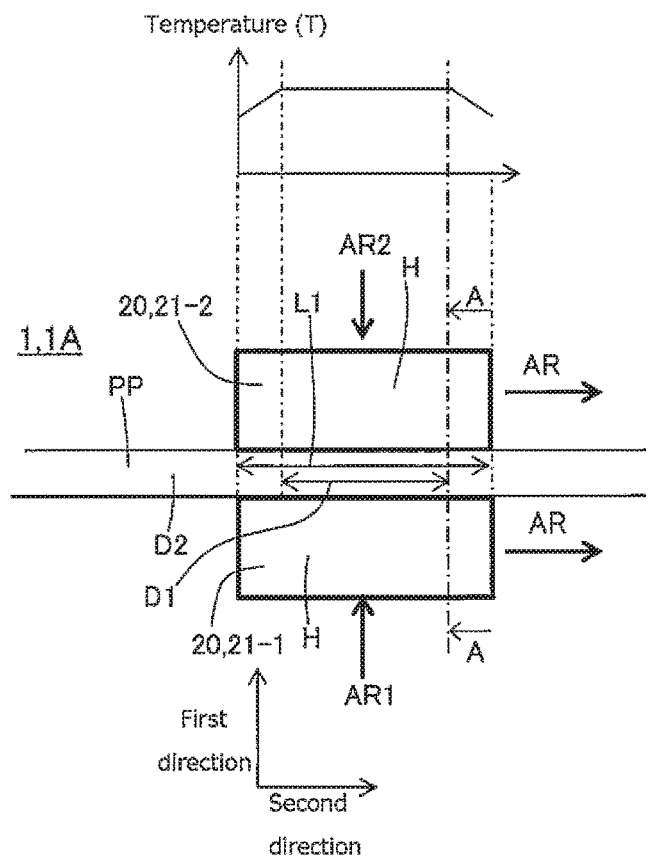
FIG. 2A is a schematic side view illustrating one step of the composite material component manufacturing method according to the first embodiment.
Figure 2B:
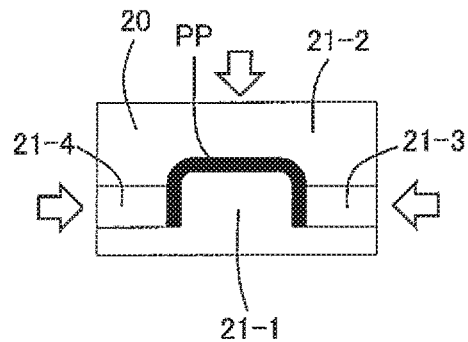
FIG. 2B is a cross-sectional view taken along the line A-A of FIG. 2A.
Figure 2C:
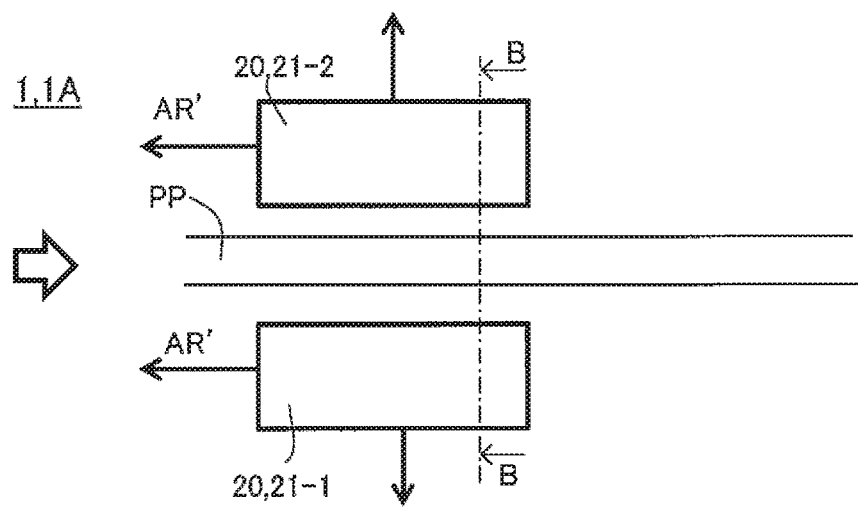
FIG. 2C is a schematic side view illustrating one step of the composite material component manufacturing method according to the first embodiment.
Figure 2D:
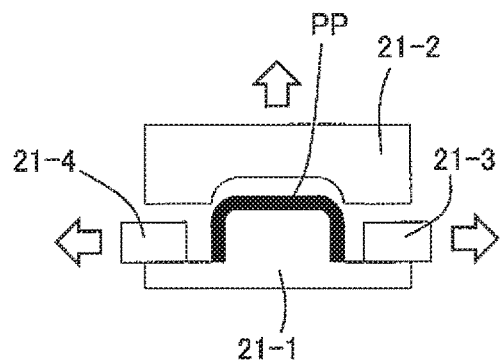
FIG. 2D is a cross-sectional view taken along the line B-B of FIG. 2C.
Figure 3A:
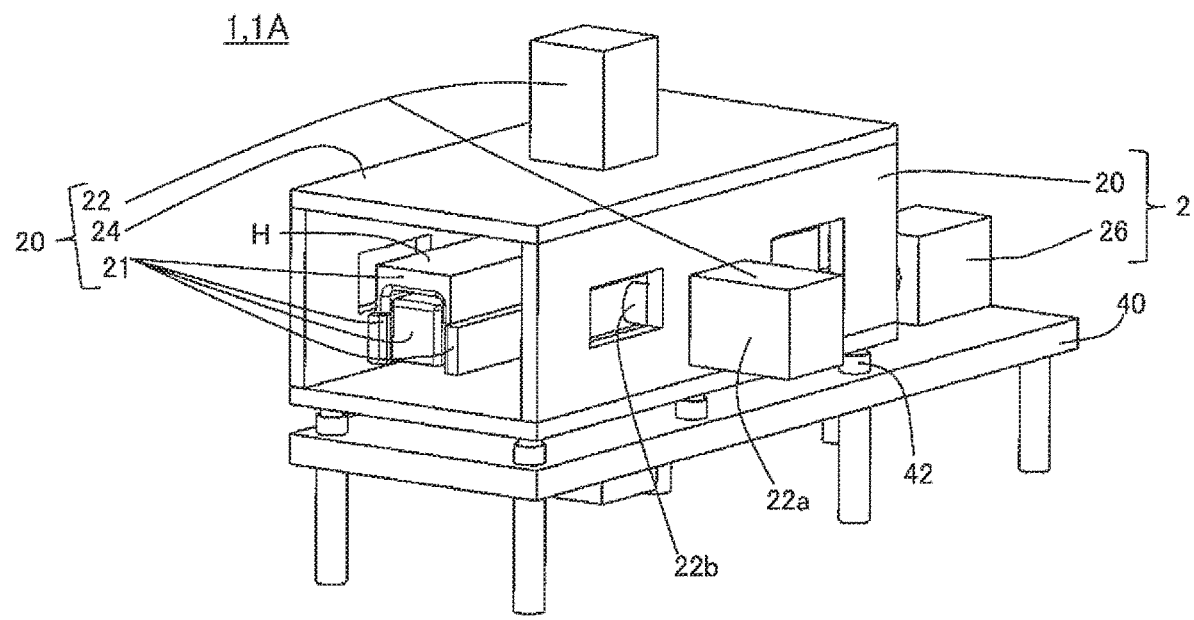
FIG. 3A is a schematic perspective view illustrating a composite material component manufacturing device according to the first embodiment.
Figure 3B:
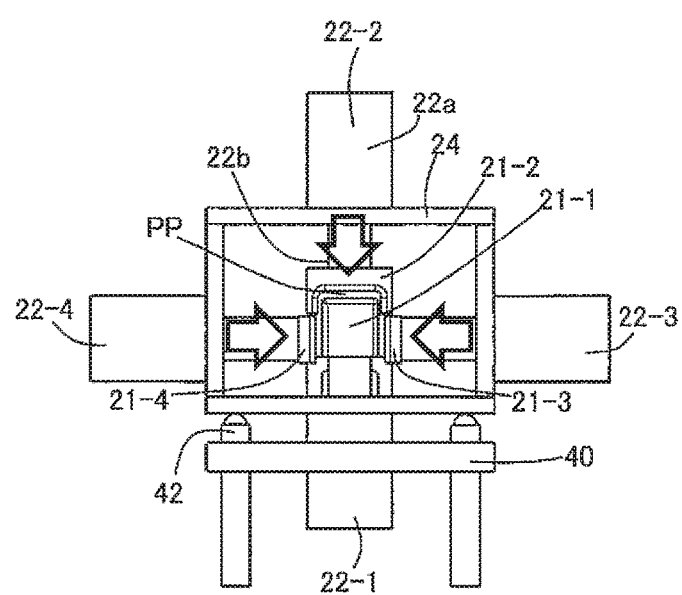
FIG. 3B is a schematic front view illustrating a composite material component manufacturing device according to the first embodiment.
Figure 3C:
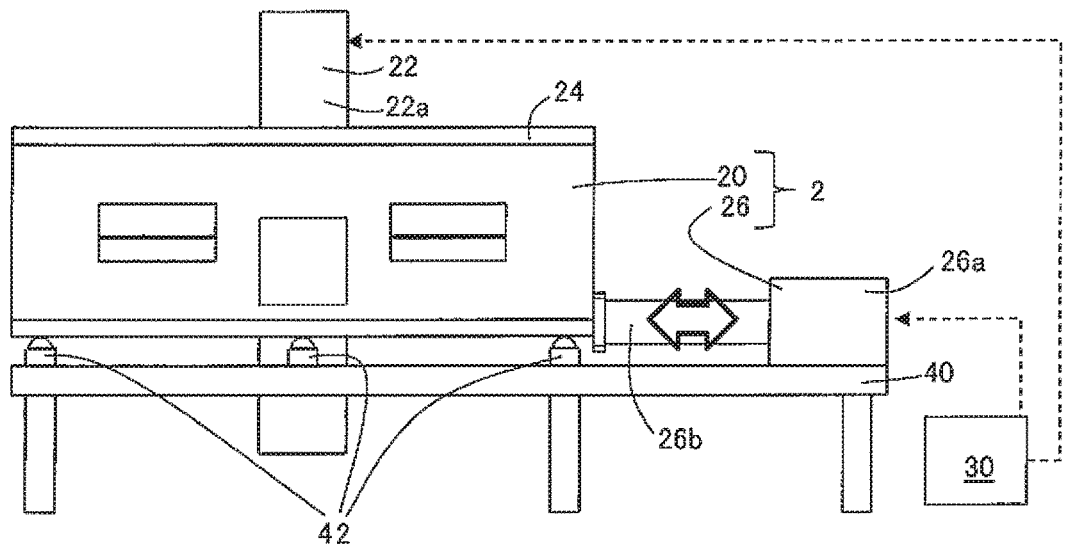
FIG. 3C is a schematic side view illustrating a composite material component manufacturing device according to the first embodiment.

Referring to FIG. 1 to FIG. 3C, a composite material component manufacturing method and a composite material component manufacturing device 1A according to the first embodiment will be described. FIG. 1 is a flowchart illustrating an example of a composite material component manufacturing method according to a first embodiment. FIG. 2A is a schematic side view illustrating one step of the composite material component manufacturing method according to the first embodiment. FIG. 2B is a cross-sectional view taken along the line A-A of FIG. 2A. FIG. 2C is a schematic side view illustrating one step of the composite material component manufacturing method according to the first embodiment. FIG. 2D is a cross-sectional view taken along the line B-B of FIG. 2C. FIG. 3A is a schematic perspective view illustrating a composite material component manufacturing device 1A according to the first embodiment. FIG. 3B is a schematic front view illustrating a composite material component manufacturing device 1A according to the first embodiment. FIG. 3C is a schematic side view illustrating a composite material component manufacturing device 1A according to the first embodiment.
(Manufacturing Method)

In the composite material component manufacturing method according to the first embodiment, in the step of transferring a prepreg PP (for example, a prepreg sheet), the prepreg PP moves together with a pressing device 20 in a state in which a pressing force is applied by the pressing device 20. In the example illustrated in FIG. 2A, the arrow AR1 indicates the direction of action of the pressing force from a first pressing member 21-1 that constitutes a portion of the pressing device 20 on the prepreg PP, the arrow AR2 indicates the direction of action of the pressing force from a second pressing member 21-2 that constitutes a part of the pressing device 20 on the prepreg PP, and the arrow AR indicates the direction of transfer of the prepreg PP. The prepreg PP is transported together with the pressing device 20 (the first pressing member 21-1 and the second pressing member 21-2) in the direction indicated by the arrow AR in a state in which a pressing force is applied by the pressing device 20 (the first pressing member 21-1 and the second pressing member 21-2).

Each step of the composite material component manufacturing method according to the first embodiment will be described. In the first-step ST1 illustrated in FIG. 1, heat and pressure are applied to the prepreg PP by the pressing device 20. As a result, the prepreg PP is formed. It should be noted that, in cases in which the resin of the prepreg PP is a thermosetting resin, it is heated so that the temperature of the prepreg PP is greater than or equal to a polymerization initiation temperature, and in cases in which the resin of the prepreg PP is a thermoplastic resin, it is heated so that the temperature of the prepreg PP is greater than or equal to a melting point temperature.

In FIG. 2A, a first pressing member 21-1 and a second pressing member 21-2, which constitute portions of the pressing device 20, are illustrated. The first pressing member 21-1 and the second pressing member 21-2 are disposed opposite to each other with the prepreg PP interposed therebetween, and can sandwich the prepreg PP.

When the direction in which the first pressing member 21-1 applies the pressing force to the prepreg PP is defined as the "first direction," the direction in which the second pressing member 21-2 applies the pressing force to the prepreg PP is opposite to the "first direction." In the example illustrated in FIG. 2A, when the pressing force is applied to the prepreg PP, the first pressing member 21-1 moves in the first direction, and the second pressing member 21-2 moves in a direction opposed to the first direction. Alternatively, when the pressing force is applied to the prepreg PP, only one of the first pressing member 21-1 or the second pressing member 21-2 may move, and the other of the first pressing member 21-1 or the second pressing member 21-2 may not move.

In FIG. 2B, in addition to the first pressing member 21-1 and the second pressing member 21-2, a third pressing member 21-3 and a fourth pressing member 21-4, which form parts of the pressing device 20, are illustrated. When a pressing force is applied to the prepreg PP, the third pressing member 21-3 moves in a direction perpendicular to the first direction, and the fourth pressing member 21-4 moves in a direction opposite to the moving direction of the third pressing member.

In FIG. 2B, the pressing device 20 includes four pressing members (the first pressing member 21-1, the second pressing member 21-2, the third pressing member 21-3, and the fourth pressing member 21-4), but the number of the pressing members 21 included in the pressing device 20 is not limited to four, and may be any number. The number of the pressing members may be two (the first pressing member 21-1 and the second pressing member 21-2), may be three, five, six, or the like. The direction of action of the pressing force may be appropriately changed in accordance with the shape or the number of the pressing members. For example, in the example illustrated in FIG. 2B, the direction of action of the pressing force of the third pressing member 21-3 is perpendicular to the direction of action of the pressing force of the first pressing member 21-1, but the direction of action of the pressing force of the third pressing member 21-3 need not be perpendicular to the direction of action of the pressing force of the first pressing member 21-1.

The pressing device 20 includes a heat generating means such as a heater H. Therefore, when the pressing device 20 is pressing the prepreg PP, heat is applied to the prepreg PP, and the prepreg PP is suitably molded. The heat generating means (the heater H) may be provided in each of the plurality of pressing members (21-1, 21-2, 21-3, 21-4), or may be provided in only some of the plurality of pressing members.

In the second step ST2, the prepreg PP is transferred. In the second step ST2, the prepreg PP moves together with the pressing device 20 while the pressing force is applied to the prepreg PP by the pressing device 20.

Referring to FIG. 2A, the prepreg PP moves in the second direction (the direction indicated by the arrow AR) together with the pressing device 20 (more specifically, the first pressing member 21-1) while the pressing force is applied in the first direction by the pressing device 20 (more specifically, the first pressing member 21-1). In the example illustrated in FIG. 2A, the second direction is a direction perpendicular to the first direction.

In FIG. 2A, the prepreg PP moves together with the first pressing member 21-1 and the second pressing member 21-2 while the prepreg PP is sandwiched by the first pressing member 21-1 and the second pressing member 21-2. At this time, a portion D1 that has been softened by the heating does not move relative to the first pressing member 21-1 and the second pressing member 21-2. Accordingly, tension does not act on the portion D1 that has been softened by the heating. When the prepreg PP is transferred, the heater H included in the pressing device 20 may be turned on or off. The heater H may be constantly turned on during the operation of the composite material component manufacturing device.

In FIG. 2B, the prepreg PP moves together with the first to fourth pressing members 21-1 to 21-4 while the prepreg PP is sandwiched by the first pressing member 21-1 and the second pressing member 21-2, and also sandwiched by the third pressing member 21-3 and the fourth pressing member 21-4. In this case, the transfer of the prepreg PP is carried out more reliably. In the example illustrated in FIG. 2B, when the prepreg PP is transferred, the entire circumference of the prepreg PP (that is, the entire circumference of a cross section perpendicular to the longitudinal direction of the prepreg PP), contacts the pressing device 20. For this reason, the shape of the prepreg PP does not collapse when the prepreg PP is transferred.

In the third step ST3, the pressing force applied to the prepreg PP is released. In FIG. 2C, in the third-step ST3, the first pressing member 21-1 moves in a direction away from the prepreg PP, and the second pressing member 21-2 moves in a direction away from the prepreg PP. It should be noted that, as illustrated in FIG. 2D, in the third step ST3, the first pressing member 21-1 may not move, and may remain in contact with the prepreg PP.

In the example illustrated in FIG. 2D, the second pressing member 21-2 moves in a direction away from the prepreg PP, the third pressing member 21-3 moves in a direction away from the prepreg PP, and the fourth pressing member 21-4 moves in a direction away from the prepreg PP. It should be noted that, in the example illustrated in FIG. 2D, the first pressing member 21-1 may also move away from the prepreg PP.

In the fourth step ST4, the pressing device 20 moves in a direction opposite to the transfer direction of the prepreg PP (in the direction indicated by the arrow AR' in FIG. 2C). That is, the first pressing member 21-1 and the second pressing member 21-2 (or the first to fourth pressing members 21-1 to 21-4) move in the direction indicated by the arrow AR'. Then, the pressing device 20 returns to its original position prior to beginning the first-step ST1 (the home position). In this way, a composite material component is produced. It should be noted that, thereafter, the composite material component may be subjected to further processing, such as cutting.

The first to fourth steps ST1 to ST4 are repeatedly executed. As a result, composite material components are continuously manufactured (formed). It should be noted that the moving distance when the pressing device 20 moves together with the prepreg PP (in other words, the moving distance of the prepreg PP when the first to fourth steps ST1 to ST4 are executed once; that is, the moving distance of the prepreg PP in one cycle) is shorter than the length L1 (hereinafter, referred to as the "pressing surface length") of the pressing surface of the pressing device 20 along the moving direction of the prepreg PP. For example, the above-mentioned moving distance (transfer distance) is ½ or less of the length of the pressing surface (for example, the length of the pressing surface of the first pressing member 21-1).

In the composite material component manufacturing method according to the first embodiment, the prepreg PP moves together with the pressing device 20 in a state in which a pressing force is applied by the pressing device 20. Accordingly, the prepreg PP can be transferred without applying a load (tension) to the portion D1 softened by the heat from the pressing device 20. Referring now to FIG. 2A, it should be noted that when the prepreg PP is transferred, tension acts on a portion D2 of the prepreg PP that is upstream of the pressing device 20. However, since the portion D2 is not softened by the pressing device 20, there is no particular problem even if tension acts on the portion D2. It should be noted that the portion between the portion D1 and the portion D2 is a portion having a lower temperature than the portion D1 due to the influence of the outside air or the like, and is a portion having a relatively small influence of softening of the prepreg PP.

In addition, in the composite material component manufacturing method according to the first embodiment, tension is not applied to the portion D1 softened by heat from the pressing device 20. Accordingly, it is possible to use a prepreg composed of a resin and a discontinuous fiber, such as a long fiber or a short fiber, as the prepreg PP. Alternatively, when a prepreg composed of a resin and a continuous fiber, such as a unidirectional fiber or a textile material, is used as the prepreg PP, it is also possible to use a conventional pulling type molding method (pultrusion molding methods, ADP molding methods, or the like). However, in the conventional pulling type molding methods, tension is applied to the portion softened by the heat from the pressing device 20, so that a residual stress is generated in the composite material component after molding. Specifically, since tension is applied to the fiber direction of each layer, residual stress is generated between adjacent layers having different fiber directions, and a twist or the like may be generated in the molded product. In contrast, in the case of using the composite material component manufacturing method according to the first embodiment, residual stress is not generated in the composite material component after molding, or the residual stress is reduced.

As a measure for not applying tension to the portion softened by the heat from the pressing device 20, a measure for disposing the entire prepreg in an autoclave and molding it, or a measure of forming the prepreg using a large press machine can be considered. However, in cases in which these measures are used to manufacture elongated composite material components, large equipment becomes necessary. On the other hand, in the composite material component manufacturing method according to the first embodiment, it is possible to manufacture elongated composite material components with small-sized equipment without applying tension to the portion softened by heat from the pressing device 20. In addition, in the composite material component manufacturing method according to the first embodiment, since the composite material components are formed continuously, a component of an arbitrary length (a composite material component of an arbitrary length) can be manufactured by adding a cutting step.

It should be noted that in the examples described in FIG. 2A to FIG. 2D (or the examples described in FIG. 3A to FIG. 3C, which will be described later), the cross-section perpendicular to the longitudinal direction of the molded composite material component does not change along the longitudinal direction. Alternatively, by performing molding using a moving mold or the like illustrated in Patent Document 3, a composite material component may be formed in which the cross-section perpendicular to the longitudinal direction of the composite material component (for example, a plate thickness of the composite material component) changes in accordance with the position in a direction along the longitudinal direction.

It should be noted that the resin of the prepreg PP in the first embodiment may be a thermosetting resin or a thermoplastic resin. In other words, the composite material component may be a CFRP or a CFRTP. In addition, the composite material component according to the first embodiment may be an aircraft component, an automobile component, or any other component for consumer equipment. The composite material component may, for example, be a structural material of an aircraft fuselage (fuselage skin, etc.), a wing (wing skin, wing spar, etc.), a door panel, a floor spar, or the like.

(Manufacturing Device)

Next, a composite material component manufacturing device 1A according to the first embodiment will be described with reference to FIG. 3A to FIG. 3C. The composite material component manufacturing device 1A includes a pressing device 20 for applying heat and pressure to the prepreg PP, and a transfer device 2 for transferring the prepreg PP.

In FIG. 3A, the pressing device 20 includes a pressing member 21 and a pressing actuator 22. The pressing device 20 may include a frame 24.

In FIG. 3B, the pressing device 20 includes a first pressing member 21-1, a second pressing member 21-2, a third pressing member 21-3, a fourth pressing member 21-4, a first actuator 22-1, a second actuator 22-2, a third actuator 22-3, and a fourth actuator 22-4. It should be noted that in the first embodiment, the number of the pressing members 21 is not limited to four and may be any number, and the number of the pressing actuators 22 is not limited to four and may be any number.

In FIG. 3B, the first pressing member 21-1 is a member that presses the prepreg PP from below the prepreg PP, and the second pressing member 21-2 is a member that presses the prepreg PP from above the prepreg PP. The prepreg PP is sandwiched by the first pressing member 21-1 and the second pressing member 21-2. In addition, the third pressing member 21-3 and the fourth pressing member 21-4 are members for pressing the prepreg PP from the side. The prepreg PP is sandwiched between the third pressing member 21-3 and the first pressing member 21-1, and is sandwiched between the fourth pressing member 21-4 and the first pressing member 21-1.

In FIG. 3B, the pressing member 21 is moved in a direction toward the prepreg PP or a direction away from the prepreg PP by the pressing actuator 22. More specifically, the first pressing member 21-1 is moved by the first actuator 22-1, the second pressing member 21-2 is moved by the second actuator 22-2, the third pressing member 21-3 is moved by the third actuator 22-3, and the fourth pressing member 21-4 is moved by the fourth actuator 22-4. Alternatively, at least one of the plurality of pressing actuators may be omitted. For example, the first actuator 22-1 may be omitted, and the first pressing member 21-1 may not be movable in the vertical direction.

In the example illustrated in FIG. 3B, the main body portion 22a of the pressing actuator 22 is connected to a frame 24, and the main body portion 22a of the pressing actuator 22 is supported by the frame 24. In addition, the telescopic portion 22b of the pressing actuator 22 is movable with respect to the frame 24, and the pressing member 21 is connected to the distal end of the telescopic portion 22b.

The transfer device 2 transfers the prepreg PP via the pressing member 21. In other words, the transfer device 2 transfers the prepreg PP by moving the pressing device 20. Accordingly, in the first embodiment, the transfer device 2 includes the pressing device 20.

In the examples illustrated in FIG. 3A and FIG. 3C, the transfer device 2 includes a pressing device 20 and a transfer actuator 26 for moving the pressing device 20 along the transfer direction of the prepreg PP. The transfer actuator 26 is directly or indirectly connected to the pressing device 20. In the examples illustrated in FIG. 3A and FIG. 3C, the transfer actuator 26 is connected to the pressing member 21 via the frame 24 and the pressing actuator 22. More specifically, the telescopic portion 26b of the transfer actuator 26 is connected to the frame 24, the frame 24 and the pressing actuator 22 (the main body portion 22a) are connected, and the pressing actuator 22 (the telescopic portion 22b) and the pressing member 21 are connected to each other.

In the example illustrated in FIG. 3C, the main body portion 26a of the transfer actuator 26 is connected to the base 40. Then, the frame 24 moves relative to the base 40 as a result of the movement of the telescopic portion 26b relative to the main body portion 26a. It should be noted that bearings 42, such as ball bearings, are preferably disposed between the base 40 and the frame 24. In the example illustrated in FIG. 3C, the frame 24 is supported by the base 40 via a plurality of bearings 42. It should be noted that instead of the bearings 42, a linear rail member and a sliding member that slides on the linear rail member may be disposed between the base 40 and the frame 24.

In the example illustrated in FIG. 3C, the transfer device 2 moves the pressing device 20 along the transfer direction of the prepreg PP. The transfer direction of the prepreg PP is a direction that is perpendicular to the direction in which the pressing device 20 (for example, the first pressing member 21-1) presses the prepreg PP.

The composite material component manufacturing device 1A may include a control device 30. When the pressing device 20 is pressing the prepreg PP, the control device 30 sends a movement command for the pressing device 20 to the transfer device 2 (more specifically, to the transfer actuator 26). Based on this movement command, the pressing device 20 and the prepreg PP move by a predetermined distance set in advance. After the movement of the prepreg PP, the control device 30 sends a press release command to the pressing device 20. Based on this press release command, the pressing device 20 separates from the prepreg PP. After the pressing device 20 is separated from the prepreg PP, the control device 30 sends a return command to the transfer device 2. In response to this return command, the pressing device 20 returns to its original position (the home position).

The composite material component manufacturing method according to the first embodiment may be performed by the composite material component manufacturing device 1A described above. In this case, the composite material component manufacturing device 1A achieves the same effects as those exhibited in the composite material component manufacturing method according to the first embodiment.

It should be noted that, in the examples illustrated in FIG. 3A, the pressing members 21 have an elongated block shape. More specifically, the first pressing member 21-1 has an elongated block shape that has an upper surface that can contact the prepreg PP and two side surfaces that can contact the prepreg PP. In addition, the second pressing member 21-2 includes a concave portion formed continuously along the longitudinal direction, and the concave portion has a bottom surface that can contact the prepreg PP and two inner side surfaces that can contact the prepreg PP. Each of the third pressing member 21-3 and the fourth pressing member 21-4 also has a side surface facing a portion of the side surface of the first pressing member 21-1. However, the shapes of the pressing members 21 are not limited to the examples illustrated in FIG. 3A, and may be arbitrarily selected.

In the examples illustrated in FIG. 3A, the composite material component manufacturing device 1A is a device for manufacturing a composite material component having a C-shaped cross section (or a U-shaped cross section), but the cross-sectional shape of the composite material component manufactured by the composite material component manufacturing device 1A is not limited to a C-shaped cross section.

In the first embodiment, the prepreg PP supplied to the pressing device 20 may be a prepreg sheet laminated by an auto fiber placement (AFP) machine. Alternatively, the prepreg PP supplied to the pressing device 20 may be a single-layer or multi-layer prepreg sheet fed from a bobbin. The number of bobbins for feeding out the prepreg sheet may be one, two, or more. The prepreg sheet fed out from the bobbin may be subjected to bend processing, and the prepreg sheet subjected to bend processing may be supplied to the pressing device 20. In addition, the widths of the plurality of prepreg sheets stacked before being supplied to the pressing device 20 may all be the same, or may differ from each other.

Second Embodiment

Figure 4:
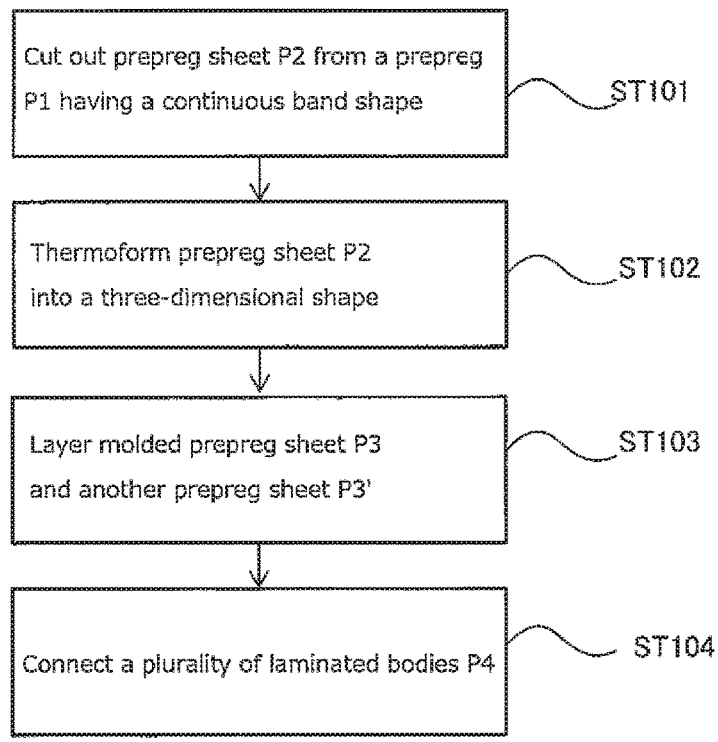
FIG. 4 is a flowchart illustrating an example of a method of preparing a laminate body with a molded prepreg sheet and another prepreg sheet.
Figure 5:
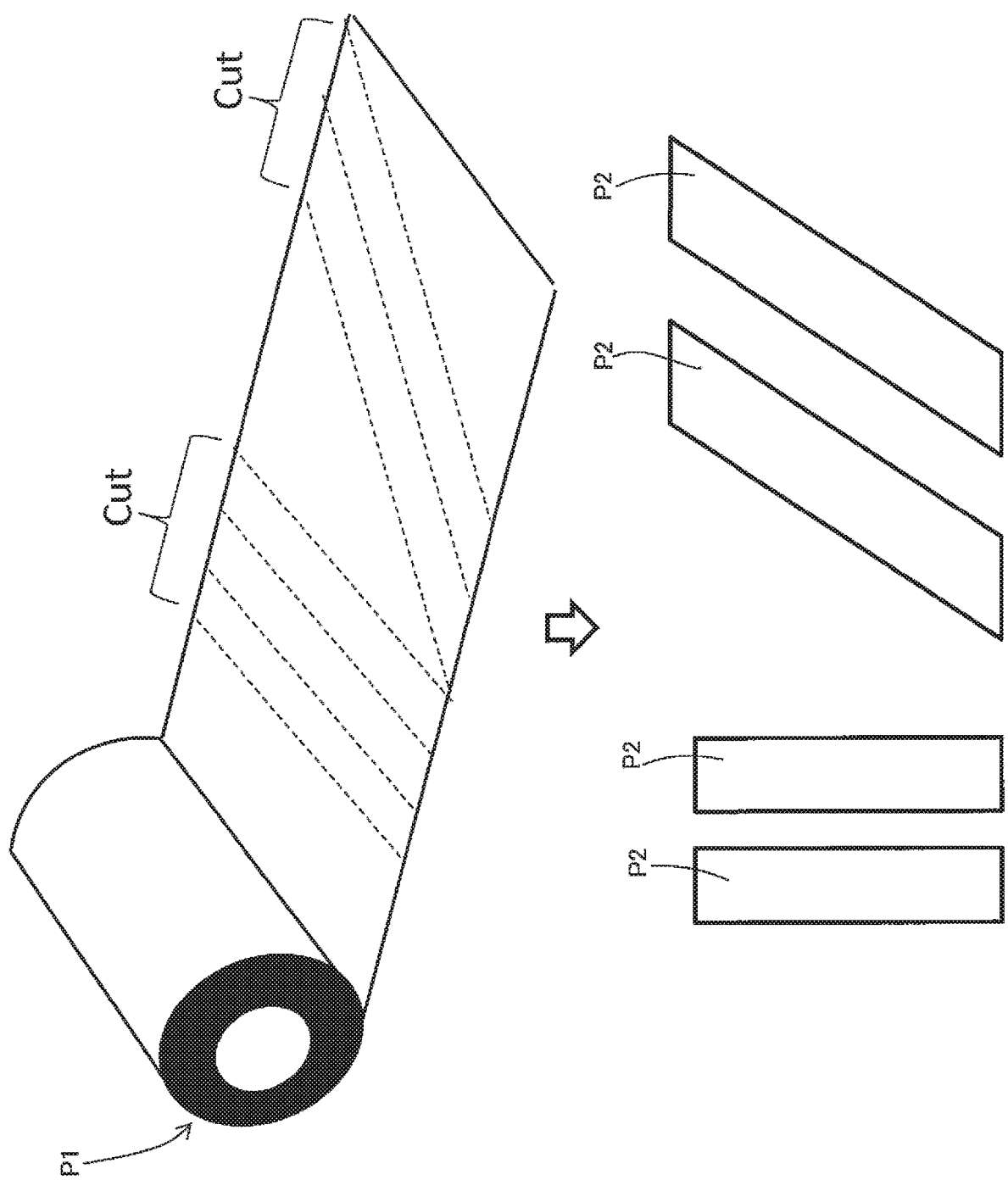
FIG. 5 is a diagram schematically illustrating a state in which a prepreg sheet is cut out from a prepreg having a continuous band shape.
Figure 6:
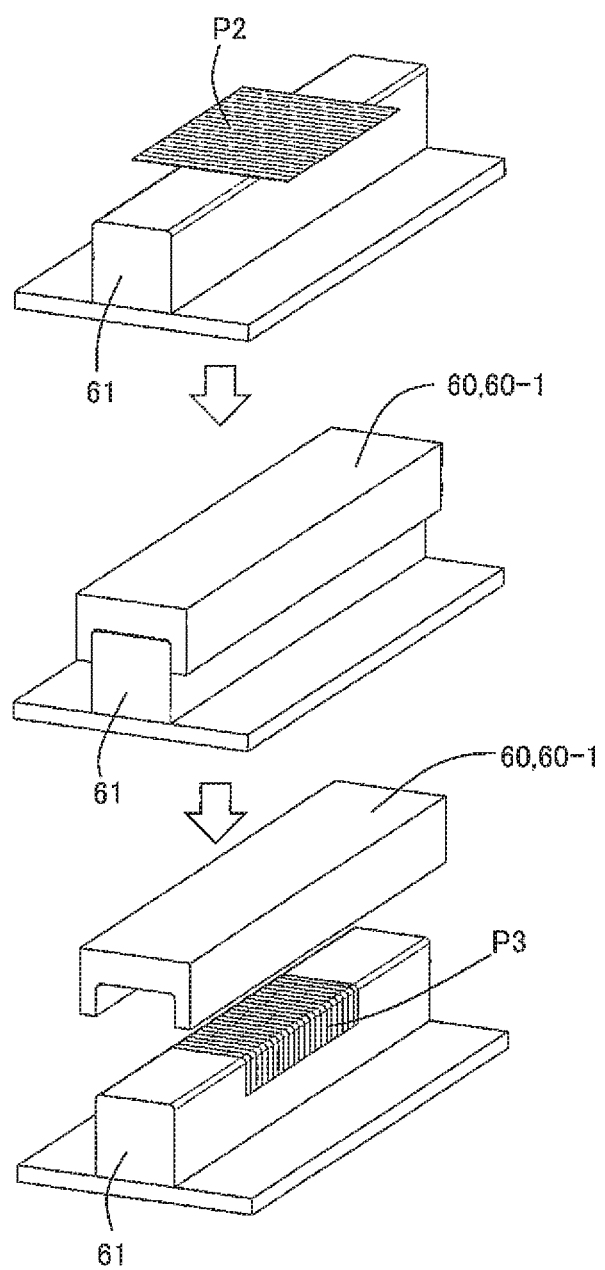
FIG. 6 is a diagram schematically illustrating a state of molding the cut prepreg sheet.
Figure 7:
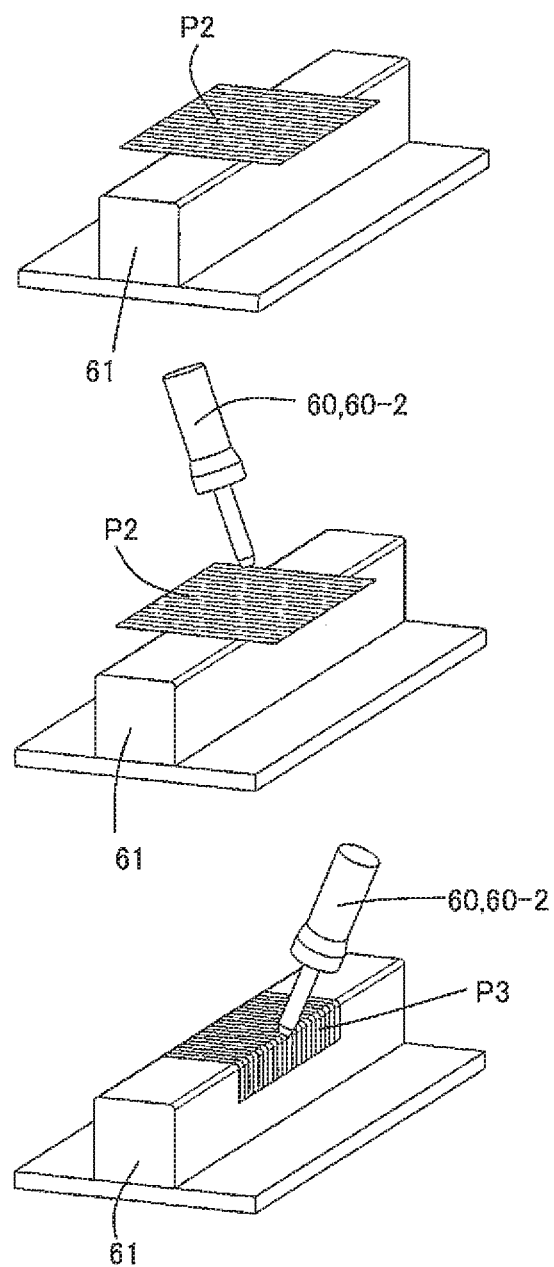
FIG. 7 is a diagram schematically illustrating a state of molding the cut prepreg sheet.
Figure 8:
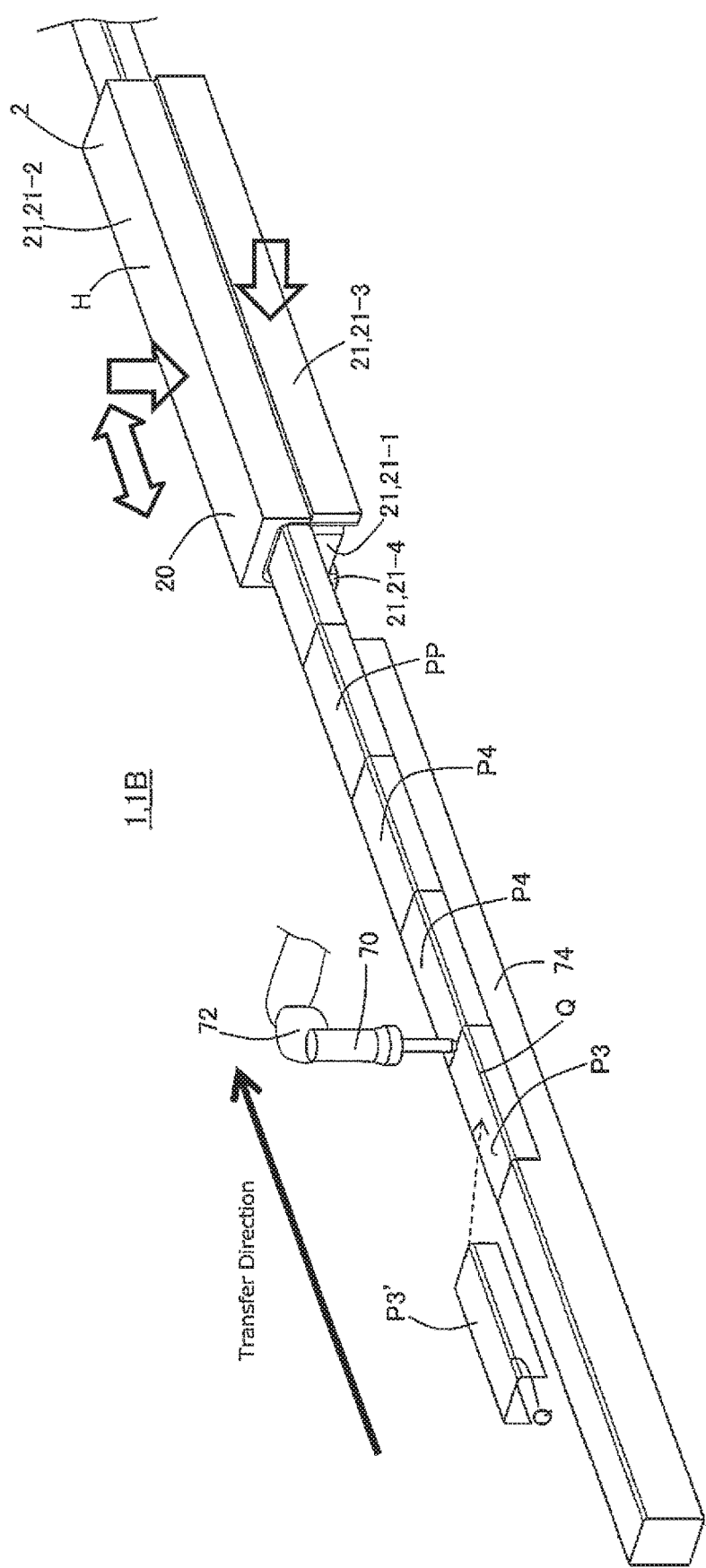
FIG. 8 is a diagram schematically illustrating a composite material component manufacturing device according to a second embodiment.

The composite material component manufacturing method and the composite material component manufacturing device 1B according to the second embodiment will be described with reference to FIG. 4 to FIG. 8. FIG. 4 is a flowchart illustrating an example of a method of preparing a laminate body P4 with a molded prepreg sheet P3 and another prepreg sheet P3'. FIG. 5 is a diagram schematically illustrating a state in which a prepreg sheet P2 is cut out from a prepreg P1 having a continuous band shape. FIG. 6 is a diagram schematically illustrating a state of molding the cut prepreg sheet P2. FIG. 7 is a diagram schematically illustrating a state of molding the cut prepreg sheet P2. FIG. 8 is a diagram schematically illustrating a composite material component manufacturing device according to the second embodiment. In FIG. 8, in order to avoid complication of the drawings, the configuration of the composite material component manufacturing device 1B is described in a simplified manner.

The manufacturing method of the composite material component and the composite material component manufacturing apparatus 1B in the second embodiment differ from the manufacturing method of the composite material component and the composite material component manufacturing apparatus 1A in the first embodiment in that the composite material component is manufactured using a laminate body P4 of the molded prepreg sheet P3 and another prepreg sheet P3'. Otherwise, the second embodiment is the same as the first embodiment. Therefore, in the second embodiment, the description focus on those points that differ from the first embodiment, and a redundant description of those features already described in the first embodiment will be omitted.

(Method of Preparing Laminate Body P4 with Molded Prepreg Sheet P3 and Another Prepreg Sheet P3')

With reference to FIG. 4 to FIG. 8, an example of a method of preparing a laminated body P4 with a molded prepreg sheet P3 and another prepreg sheet P3' will be described.

As illustrated in FIG. 5, in Step ST101, the prepreg sheet P2 is cut out from a prepreg P1 having a continuous band shape. The cutting of the prepreg P1 can be performed using a known cutting device. It should be noted that, in the case that a small prepreg sheet P2 (for example, a strip-shaped prepreg sheet P2) has been prepared, Step ST101 can be omitted.

In Step ST102, the prepreg sheet P2 is thermoformed into a three-dimensional shape. It should be noted that, in the present specification, a three-dimensional shape refers to a shape other than a two-dimensional planar shape. The three-dimensional shape is, for example, a shape having at least one bent portion. In this case, Step ST102 includes a bending process.

In the example illustrated in FIG. 6, the prepreg sheet P2 is thermoformed into a three-dimensional shape by using a molding device 60 (a hot press device 60-1). More specifically, first, the prepreg sheet P2 is placed on a support member 61. Next, the prepreg sheet P2 is pressed by the hot press device 60-1; more specifically, the prepreg sheet P2 is sandwiched between the hot press device 60-1 and the support member 61, thereby bending the prepreg sheet P2. As a result, a prepreg sheet P3 thermoformed into a three-dimensional shape (a prepreg sheet P3 that has undergone bend processing) is obtained.

In the example illustrated in FIG. 6, Step ST102 is performed using the hot press device 60-1. The hot press device 60-1 may be a mold member illustrated in FIG. 6. Alternatively, the thermoforming device for performing Step ST102 may be a device configured to press the prepreg sheet P2 along the surface of the support member 61 using a film or the like while heating the prepreg sheet P2 with heaters or the like. Further, alternatively, as illustrated in FIG. 7, Step ST102 may be performed using other thermoforming devices 60-2, such as soldering irons, ultrasonic heating devices (ultrasonic welding devices), heat rolls, or the like. In this case, the prepreg sheet P2 placed on the support member 61 is softened and deformed by being heated by the thermoforming apparatus 60-2. In this way, the prepreg sheet P2 is bent. As a result, a prepreg sheet P3 thermoformed into a three-dimensional shape (a prepreg sheet P3 that has undergone bend processing) is obtained.

It should be noted that Step ST102 may be performed manually or automatically mechanically. When performing automation, for example, the hot press device 60-1 may be driven by a driving device such as an actuator. Alternatively, when performing automation, a thermoforming device 60-2, such as a soldering iron or an ultrasonic heating device, may be mounted on the tip of a robot arm to drive the robot arm.

In Step ST103, the molded prepreg sheet P3 and another prepreg sheet P3' are layered. In the example illustrated in FIG. 8, the another prepreg sheet P3' is also a prepreg sheet produced by using the above-described molding step (Step ST102), similarly to the prepreg sheet P3. In the example illustrated in FIG. 8, each of the prepreg sheet P3 and the another prepreg sheet P3' are prepreg sheets having a bent portion Q (prepreg sheets that have undergone bend processing).

In the example illustrated in FIG. 8, another prepreg sheet P3' is placed on the prepreg sheet P3, thereby forming the laminate body P4. The prepreg sheet P3 and the prepreg sheet P3' (that is, the laminate body P4) are preferably temporarily fixed (for example, partially welded) by an arbitrary welding device 70, such as a soldering iron or an ultrasonic heating device (ultrasonic welding device).

In Step ST104, a plurality of laminate bodies P4 are connected along the prepreg transfer direction. In the example illustrated in FIG. 8, a plurality of laminate bodies P4 are arranged along the prepreg transfer direction, and adjacent laminate bodies P4 are connected to each other by an arbitrary welding device 70 such as a soldering iron, an ultrasonic heating device (ultrasonic welding device), or the like. By connecting the plurality of laminate bodies P4, a continuous, elongated prepreg PP is produced.

It should be noted that Step ST104 may be executed separately from Step ST103, or may be executed simultaneously with Step ST103.

Steps ST103 and ST104 may be performed manually or automatically mechanically. When performing automation, for example, a welding device 70 such as a soldering iron or an ultrasonic heating device may be mounted on a welding device moving device 72 (for example, a robot arm). In other words, the composite material component manufacturing device 1B may include a welding device 70 and a welding device moving device 72 that connect neighboring laminate bodies P4. The composite material component manufacturing device 1B may include a rail member 74, which will be described later.

In the second embodiment, the steps after Step ST104 may be the same as that of the first embodiment. That is, the first to fourth steps ST1 to ST4 in the first embodiment may be executed after Step ST104. Alternatively, Steps ST103 and ST104, and the first to fourth steps ST1 to ST4 may be executed in parallel.

The first to fourth steps ST1 to ST4 in the second embodiment may be performed using the composite material component manufacturing device 1A according to the first embodiment. In other words, the pressing device 20 and the transfer device 2 according to the second embodiment may be the same as the pressing device 20 and the transfer device 2 according to the first embodiment.

In the second embodiment, a prepreg sheet P3 formed into a three-dimensional shape and the another prepreg sheet P3' are layered to prepare a prepreg PP to be supplied to the pressing device 20. In cases in which a bending process is performed in a state in which a plurality of prepreg sheets are stacked, wrinkles tend to form in each of the prepreg sheets. On the other hand, in the second embodiment, in Step ST102, the prepreg sheet P2 is subjected to the bending processing, and then the prepreg sheet P3 that was subjected to the bending processing is laminated on the another prepreg sheet P3'. Accordingly, wrinkles are less likely to occur in the prepreg sheet P3.

It should be noted that in Step ST102, it is preferable that the bending process be performed for each prepreg sheet. However, when some amount of wrinkles can be tolerated, bending may be performed in a state in which a plurality of prepreg sheets (for example, 2 to 40 sheets) are stacked.

In the example illustrated in FIG. 8, the three-dimensional shape of the prepreg sheet P3 after Step ST102 is performed matches the shape of the prepreg sheet P after molding is performed by the pressing device 20. That is, in Step ST102, the prepreg sheet P2 is formed such that the shape of the prepreg sheet P3 matches the shape of the prepreg PP after the molding performed by the pressing device 20. Alternatively, the three-dimensional shape of the prepreg sheet P3 after Step ST102 is performed may be different from the shape of the prepreg sheet P3 after the molding performed by the pressing device 20.

In the example illustrated in FIG. 8, Step ST103 (a step of layering the molded prepreg sheet P3 and the another prepreg sheet P3') is performed on the rail member 74. That is, the molded prepreg sheet P3 is placed on the rail member 74, and the other prepreg sheet P3' is placed on the prepreg sheet P3. Alternatively, the pre-laminated laminate body P4 may be mounted on the rail member 74.

In the example illustrated in FIG. 8, the laminate body P4 is composed of two prepreg sheets P3 and P3'. Alternatively, the laminate body P4 may be composed of three or more prepreg sheets (P3, P3' . . . )

In the example illustrated in FIG. 8, Step ST104 (a step of connecting a plurality of laminate bodies P4) is performed on the rail member 74. That is, in a state in which a plurality of laminate bodies P4 are mounted on the rail member 74, the step of connecting the plurality of laminate bodies P4 by the welding device 70 is performed.

It should be noted that, in the example illustrated in FIG. 8, when the second step ST2 (the step of transferring the prepreg PP) is performed, the prepreg PP, that is, the connected laminate bodies P4, slide on the rail member 74. That is, the rail member 74 functions as a guide member that defines the moving direction of the connected laminate bodies P4. The rail member 74 may be formed of metal or plastic.

It should be noted that in the second embodiment, since the prepreg sheet is thermoformed a plurality of times, it is preferable that the resin of the prepreg according to the second embodiment is a thermoplastic resin.

Modification of the Second Embodiment

In the second embodiment, an example has been described in which a prepreg sheet P3 that has been molded into a three-dimensional shape and a prepreg sheet P3' that has been molded into a three-dimensional shape are laminated to produce the laminate body P4. Alternatively, the laminate body P4 may be manufactured by laminating a prepreg sheet P3 that has been molded into a three-dimensional shape and a prepreg sheet having a two-dimensional shape (planar shape). In other words, the prepreg sheet P3' in the second embodiment may be replaced with a prepreg sheet having a two-dimensional shape (a planar shape).

Third Embodiment

Figure 9:
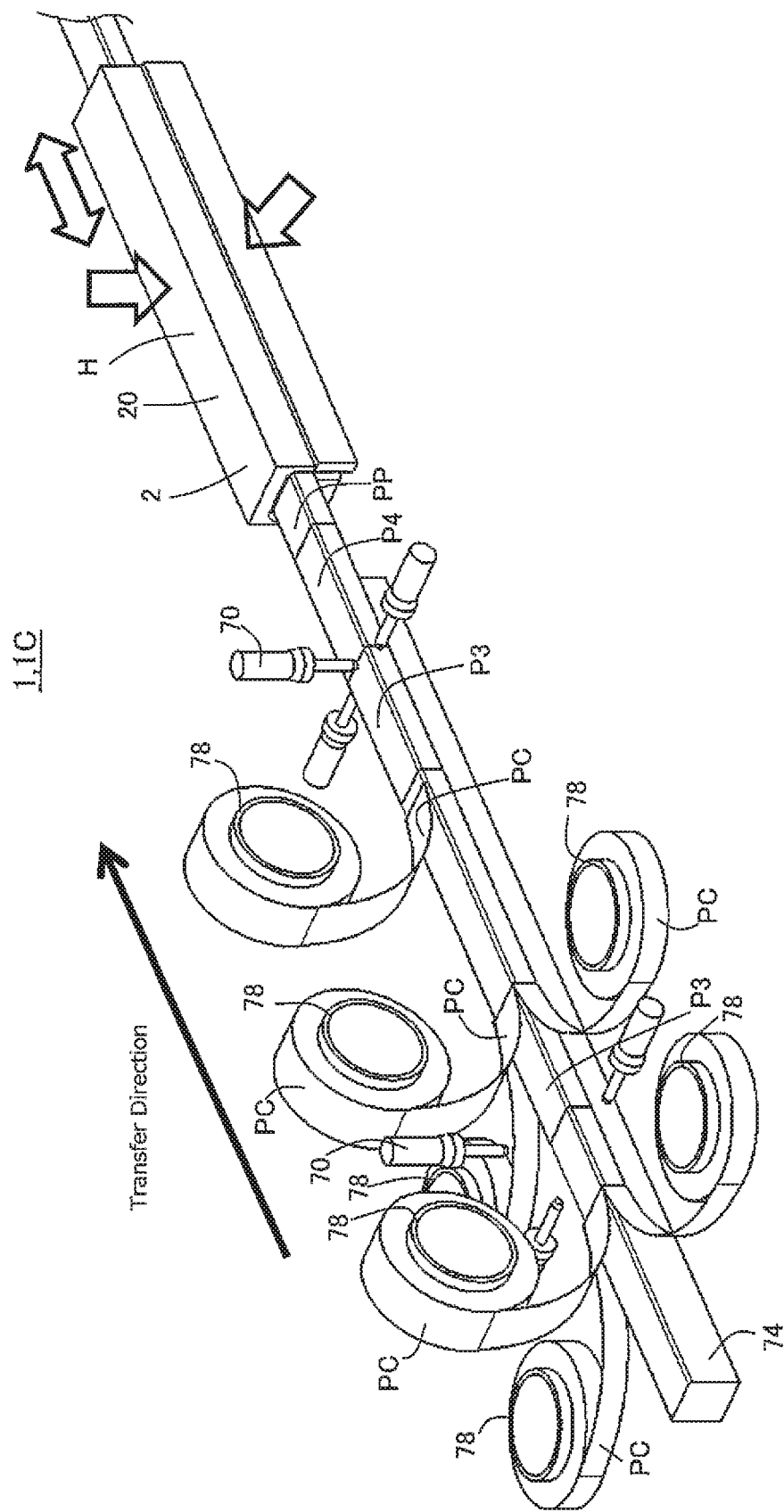
FIG. 9 is a diagram schematically illustrating a composite material component manufacturing device according to a third embodiment.

A composite material component manufacturing method and a composite material component manufacturing device 1C according to the third embodiment will be described with reference to FIG. 9. FIG. 9 is a diagram schematically illustrating a composite material component manufacturing device 1C according to the third embodiment.

The composite material component manufacturing method and the composite material component manufacturing device 1C according to the third embodiment differ from the composite material component manufacturing method and the composite material component manufacturing device 1B according to the second embodiment in that the composite material component is manufactured using a laminate body P4 formed from a prepreg sheet PC which is continuously fed out and a prepreg sheet P3 which is molded into a three-dimensional shape. Otherwise, the third embodiment is similar to the second embodiment. Accordingly, in the third embodiment, points differing from the second embodiment will be mainly described, and a redundant description of the features already described in the second embodiment will be omitted. It should be noted that in FIG. 9, in order to avoid complication of the drawings, the configuration of the composite material component manufacturing device 1C is illustrated in a simplified manner.

The prepreg sheet PC is wound around a bobbin 78. The prepreg sheet PC may be a single layer prepreg sheet or a multilayer prepreg sheet. In the example illustrated in FIG. 9, there are three prepreg sheets PC that constitute the top portion of the composite material component, and each prepreg sheet PC is wound around a corresponding bobbin 78. However, the number of prepreg sheets PC constituting the top portion of the composite material component may be one, two, or four or more. In the example illustrated in FIG. 9, there are two prepreg sheets PC that constitute the left side portion of the composite material component, and each prepreg sheet PC is wound around a corresponding bobbin 78. However, the number of prepreg sheets PC constituting the left side portion of the composite material component may be one or three or more. Further, in the example illustrated in FIG. 9, there are two prepreg sheets PC constituting the right side portion of the composite material component, and each prepreg sheet PC is wound around a corresponding bobbin 78. However, the number of prepreg sheets PC constituting the right side portion of the composite material component may be one or three or more.

In the example illustrated in FIG. 9, the prepreg sheet PC fed out from the bobbin 78 is laminated with the prepreg sheet P3 that has been molded into a three-dimensional shape. It is preferable that the prepreg sheet PC and the prepreg sheet P3 fed out from the bobbin 78 are temporarily fixed to each other (for example, partially welded) by an arbitrary welding device 70, such as a soldering iron or an ultrasonic heating device (an ultrasonic welding device). The welding device 70 may be mounted on a welding device moving device 72 (for example, a robot arm), similarly to the example described in FIG. 8.

In the example illustrated in FIG. 9, the prepreg sheet P3 that has been molded in a three-dimensional shape may be produced using the above-described Step ST102. In this case, since the prepreg sheet is thermoformed a plurality of times, it is preferable that the resin of the prepreg according to the third embodiment is a thermoplastic resin.

Modification of the Third Embodiment

In the third embodiment, an example has been described in which a prepreg sheet PC continuously fed out and a prepreg sheet P3 molded into a three-dimensional shape are layered. Alternatively, in the third embodiment, the prepreg sheet P3 that has been molded into a three-dimensional shape need not be used. In this case, the resin of the prepreg PP may be a thermoplastic resin or a thermosetting resin. In addition, the welding device 70 may be omitted.

Fourth Embodiment: Manufacturing Method

Figure 10A:
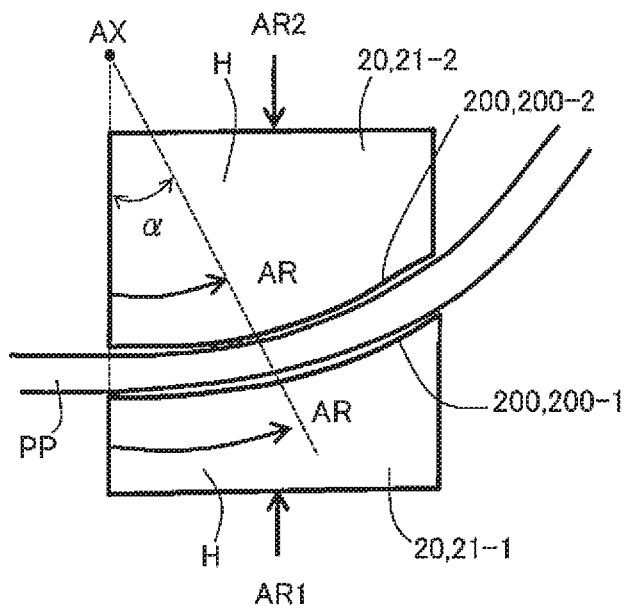
FIG. 10A is a schematic plan view illustrating one step of a composite material component manufacturing method according to a fourth embodiment.
Figure 10B:
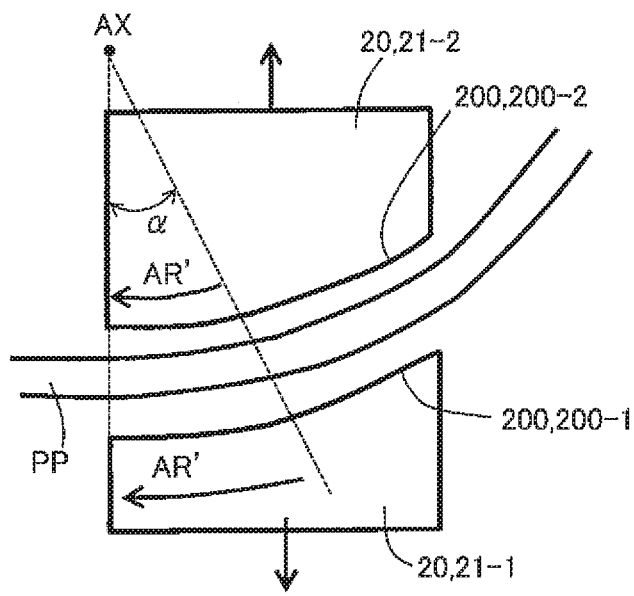
FIG. 10B is a schematic plan view illustrating one step of a composite material component manufacturing method according to the fourth embodiment.

A composite material component manufacturing method according to the fourth embodiment will be described with reference to FIG. 1, FIG. 10A, and FIG. 10B. FIG. 10A is a schematic plan view illustrating one step of a composite material component manufacturing method according to the fourth embodiment. FIG. 10B is a schematic plan view illustrating one step of the composite material component manufacturing method according to the fourth embodiment.

The composite material component manufacturing method according to the fourth embodiment differs from the composite material component manufacturing method according to the first embodiment in that the prepreg PP is moved along a curved trajectory. Otherwise, the fourth embodiment is similar to the first embodiment. Accordingly, in the fourth embodiment, the description will focus on those points that differ from the first embodiment, and a redundant description of the features already described in the first embodiment will be omitted.

In the composite material component manufacturing method according to the fourth embodiment, in the step of transferring the prepreg PP (for example, a prepreg sheet), the prepreg PP moves together with the pressing device 20 in a state in which a pressing force is applied by the pressing device 20. More specifically, the prepreg PP is transferred together with the pressing device 20 (the first pressing member 21-1 and the second pressing member 21-2) in the direction indicated by the arrow AR in a state in which the pressing force is applied by the pressing device 20 (the first pressing member 21-1 and the second pressing member 21-2). It should be noted that the trajectory indicated by the arrow AR is a curved trajectory.

The pressing surface 200 of the pressing device 20 includes a curved surface. In addition, the pressing device 20 moves along a curved trajectory. The pressing surface 200 is, for example, an arc surface. The radius of curvature of the arc surface is, for example, greater than or equal to 1,000 mm and less than or equal to 200,000 mm or less. FIG. 10A illustrates the center axis AX of the arc surface. Then, the pressing device 20 swings about the center axis AX as a swing center.

More specifically, the first pressing surface 200-1 of the first pressing member 21-1 is a curved surface (for example, an arc surface), and the second pressing surface 200-2 of the second pressing member 21-2 is a curved surface (for example, an arc surface). The center axis of the first pressing surface 200-1 (arc surface) and the center axis of the second pressing surface 200-2 (arc surface) are both center axes AX. The first pressing member 21-1 and the second pressing member 21-2 move along the curved trajectory indicated by an arrow AR about the center axis AX.

In the first step ST1, heat and pressure is applied to the prepreg PP by the pressing device 20. As a result, the prepreg PP is formed. The arrow AR1 indicates the direction of action of the pressing force from the first pressing member 21-1 on the prepreg PP, and the arrow AR2 indicates the direction of action of the pressing force from the second pressing member 21-2 on the prepreg PP. In the example illustrated in FIG. 10A, when the first pressing member 21-1 approaches the second pressing member 21-2 relatively, the prepreg PP is sandwiched between the first pressing member 21-1 and the second pressing member 21-2.

In the second step ST2, the prepreg PP is transferred. In the example illustrated in FIG. 10A, the prepreg PP moves along the curved trajectory indicated by the arrow AR together with the first pressing member 21-1 and the second pressing member 21-2 in a state in which the prepreg PP is sandwiched by the first pressing member 21-1 and the second pressing member 21-2.

In the third step ST3, the pressing force applied to the prepreg PP is released. In the example illustrated in FIG. 10B, in the third step ST3, the first pressing member 21-1 moves in a direction away from the prepreg PP, and the second pressing member 21-2 moves in a direction away from the prepreg PP.

In the fourth step ST4, the pressing device 20 moves in a direction opposite to the transfer direction of the prepreg PP (in the direction indicated by the arrow AR' in FIG. 10B). That is, the first pressing member 21-1 and the second pressing member 21-2 move in the direction indicated by the arrow AR'. In this way, the pressing device 20 returns to its original position prior to beginning the first step ST1 (home position). It should be noted that, thereafter, the composite material component may be subjected to further processing, such as cutting.

The first to fourth steps ST1 to ST4 are repeatedly executed. As a result, composite material components are continuously manufactured (formed). It should be noted that the moving distance when the pressing device 20 moves together with the prepreg PP is shorter than the pressing surface length of the pressing surface of the pressing device 20. For example, the above-mentioned moving distance (transfer distance) is ½ or less of the length of the pressing surface (for example, the length of the pressing surface of the first pressing member 21-1). In addition, the swinging angle α of the pressing device 20 is, for example, greater than 0 degrees and less than or equal to 90 degrees.

The composite material component manufacturing method according to the fourth embodiment has the same effect as the composite material component manufacturing method according to the first embodiment. In addition, in the composite material component manufacturing method according to the fourth embodiment, the pressing surface 200 of the pressing device 20 includes a curved surface, and the pressing device 20 and the prepreg PP move along a curved trajectory. Accordingly, a composite material component having a curved shape can be suitably manufactured. In conventional pulling type molding methods, tension is applied to a portion softened by the heat from a pressing device. Accordingly, even if the prepreg is formed into a curved shape, the softened portion is straightened when the prepreg is pulled and transferred. In contrast, in the fourth embodiment, the prepreg PP is transported in a state in which the softened portion is maintained by the pressing device 20. Accordingly, the softened portion is not straightened. As a result, it is possible to continuously mold composite material components having the same curvature as the curvature of the pressing surface 200 of the pressing device 20.

Fourth Embodiment: Manufacturing Device

Figure 11A:
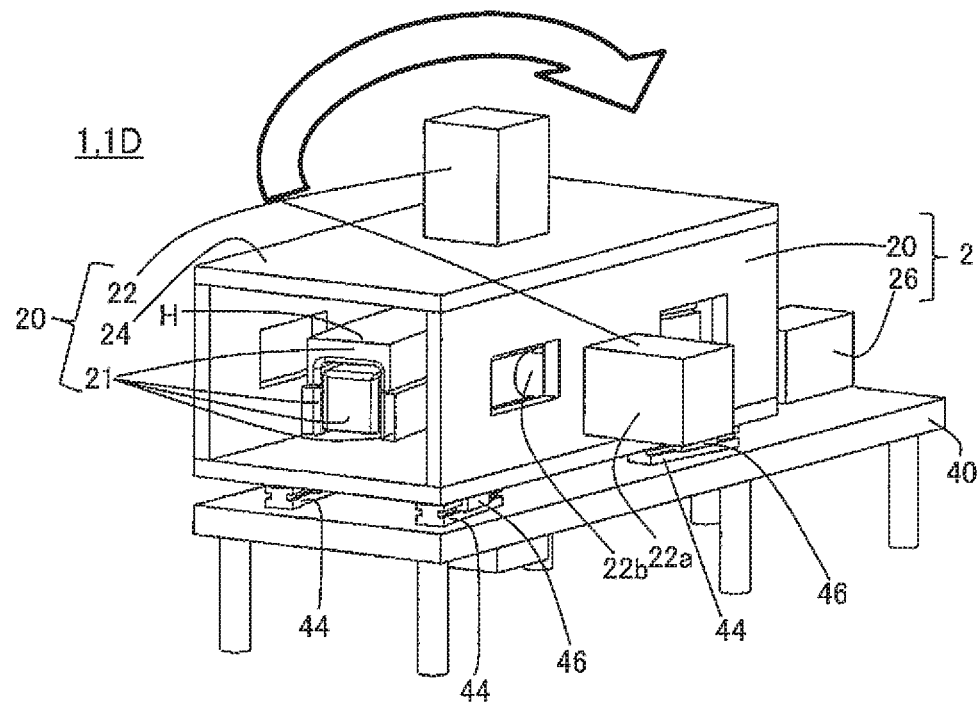
FIG. 11A is a schematic perspective view illustrating a composite material component manufacturing device according to the fourth embodiment.
Figure 11B:
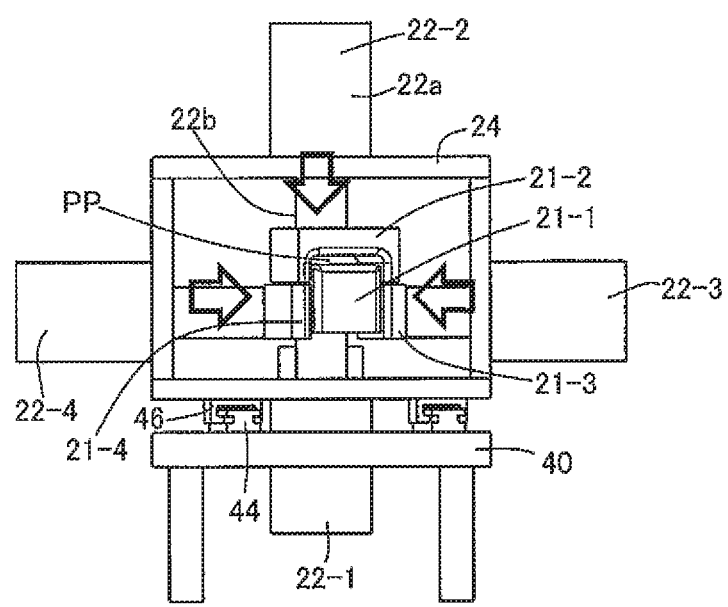
FIG. 11B is a schematic front view illustrating the composite material component manufacturing device according to the fourth embodiment.
Figure 11C:
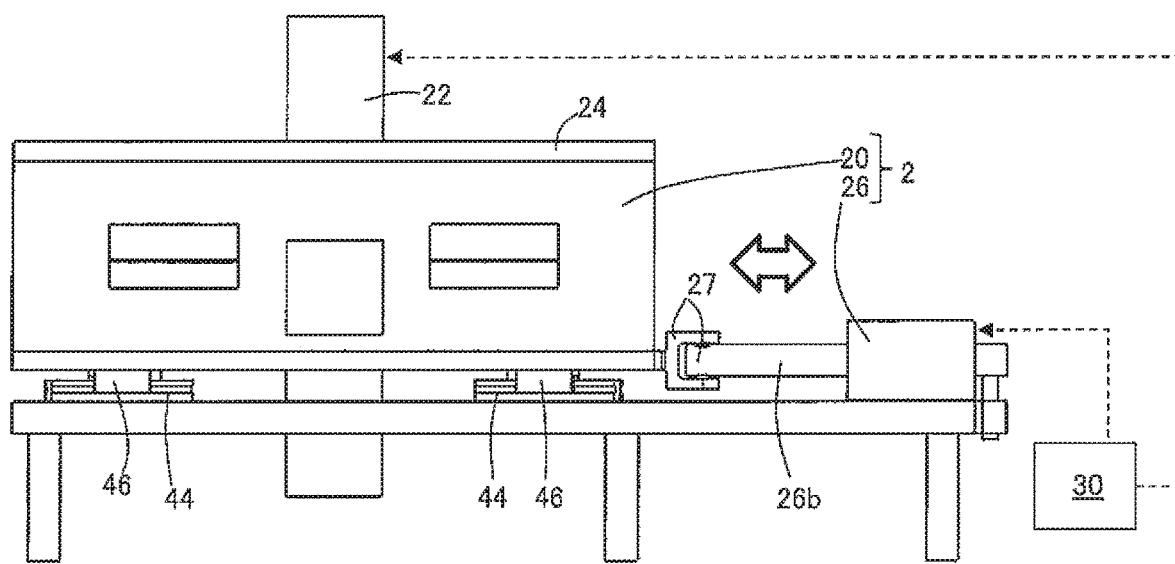
FIG. 11C is a schematic side view illustrating the composite material component manufacturing device according to the fourth embodiment.

Next, a composite material component manufacturing device 1D according to the fourth embodiment will be described with reference to FIG. 11A to FIG. 11C. FIG. 11A is a schematic perspective view illustrating a composite material component manufacturing device 1D according to the fourth embodiment. FIG. 11B is a schematic front view illustrating a composite material component manufacturing device 1D according to the fourth embodiment. FIG. 11C is a schematic side view illustrating a composite material component manufacturing device 1D according to the fourth embodiment.

The composite material component manufacturing device 1D according to the fourth embodiment differs from the composite material component manufacturing device 1A according to the first embodiment in that the prepreg PP is moved along a curved trajectory. Otherwise, the fourth embodiment is similar to the first embodiment. Accordingly, in the fourth embodiment, the description will focus on those points that differ from the first embodiment, and redundant descriptions of the features already described in the first embodiment will be omitted.

In the examples illustrated in FIG. 11A to FIG. 11C, the pressing device 20 is supported by the base 40 via a curved rail member 44 and a sliding member 46. More specifically, the curved rail member 44 is attached to the base 40 and the sliding member 46 is attached to the frame 24 of the pressing device 20. The curved rail member 44 and the sliding member 46 are engaged with each other so as to be slidable relative to each other.

In addition, in the example illustrated in FIG. 11C, the transfer actuator 26 and the pressing device 20, (more specifically, the frame 24 of the pressing device) are connected via a universal joint 27.

In the example illustrated in FIG. 11A to FIG. 11C, driving of the transfer actuator 26 causes the sliding member 46 to move relative to the curved rail member 44. As a result, the pressing device 20 moves along a curved trajectory defined by the curved rail member 44.

The composite material component manufacturing method according to the fourth embodiment may be performed by the composite material component manufacturing device 1D described above. In this case, the composite material component manufacturing device 1D achieves the same effects as those achieved by the composite material component manufacturing method according to the fourth embodiment.

It should be noted that, in the examples illustrated in FIG. 11A to FIG. 11C, each pressing member 21 has an elongated block shape having a curved surface. More specifically, the first pressing member 21-1 has an elongated block shape that has an upper surface (an upper surface in the shape of an arc belt) that can contact the prepreg PP and two side surfaces (arc surfaces) that can contact the prepreg PP. In addition, the second pressing member 21-2 includes a concave portion formed continuously along the curve, and the concave portion has a bottom surface that can contact the prepreg PP and two inner side surfaces that can contact the prepreg PP. Each of the third pressing member 21-3 and the fourth pressing member 21-4 has a side surface (an arc surface) facing a portion of the side surface of the first pressing member 21-1. However, the shape of each pressing member 21 is not limited to the examples illustrated in FIG. 11A to FIG. 11C, and may be arbitrarily selected.

Fifth Embodiment

Figure 12:
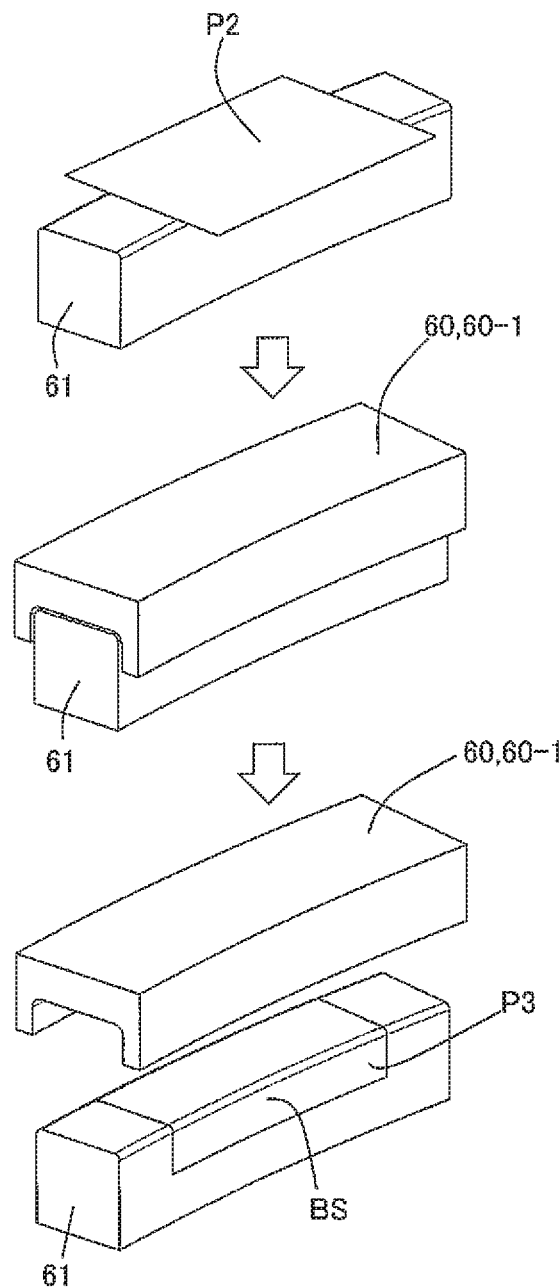
FIG. 12 is a diagram schematically illustrating a state of molding a cut prepreg sheet.
Figure 13:
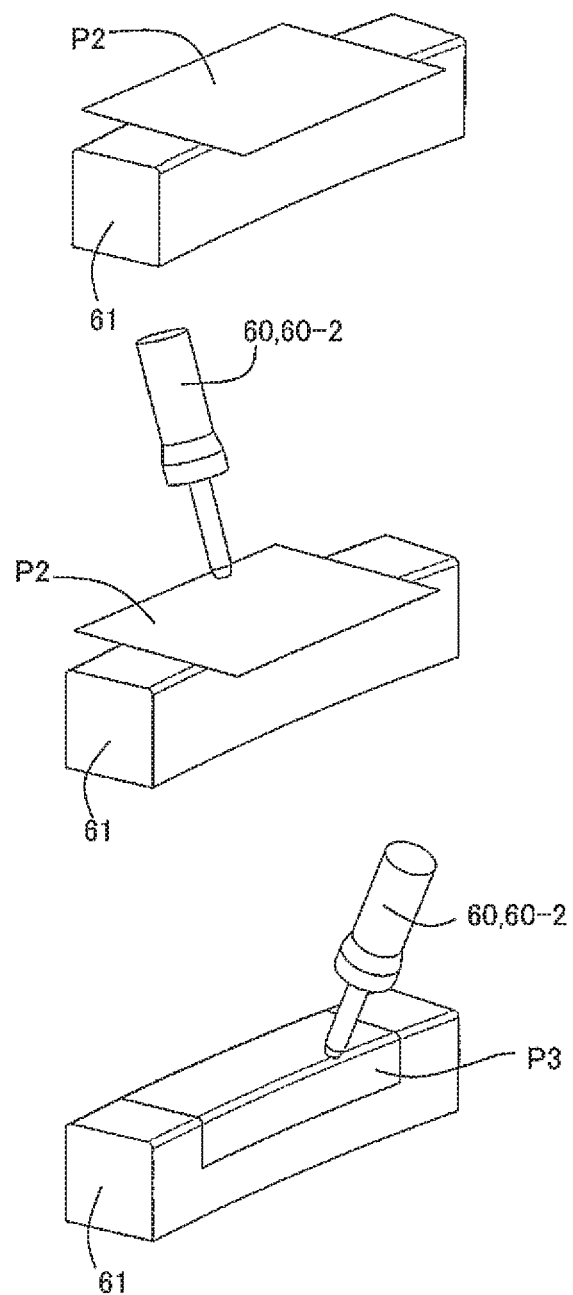
FIG. 13 is a diagram schematically illustrating a state of molding a cut prepreg sheet.
Figure 14:
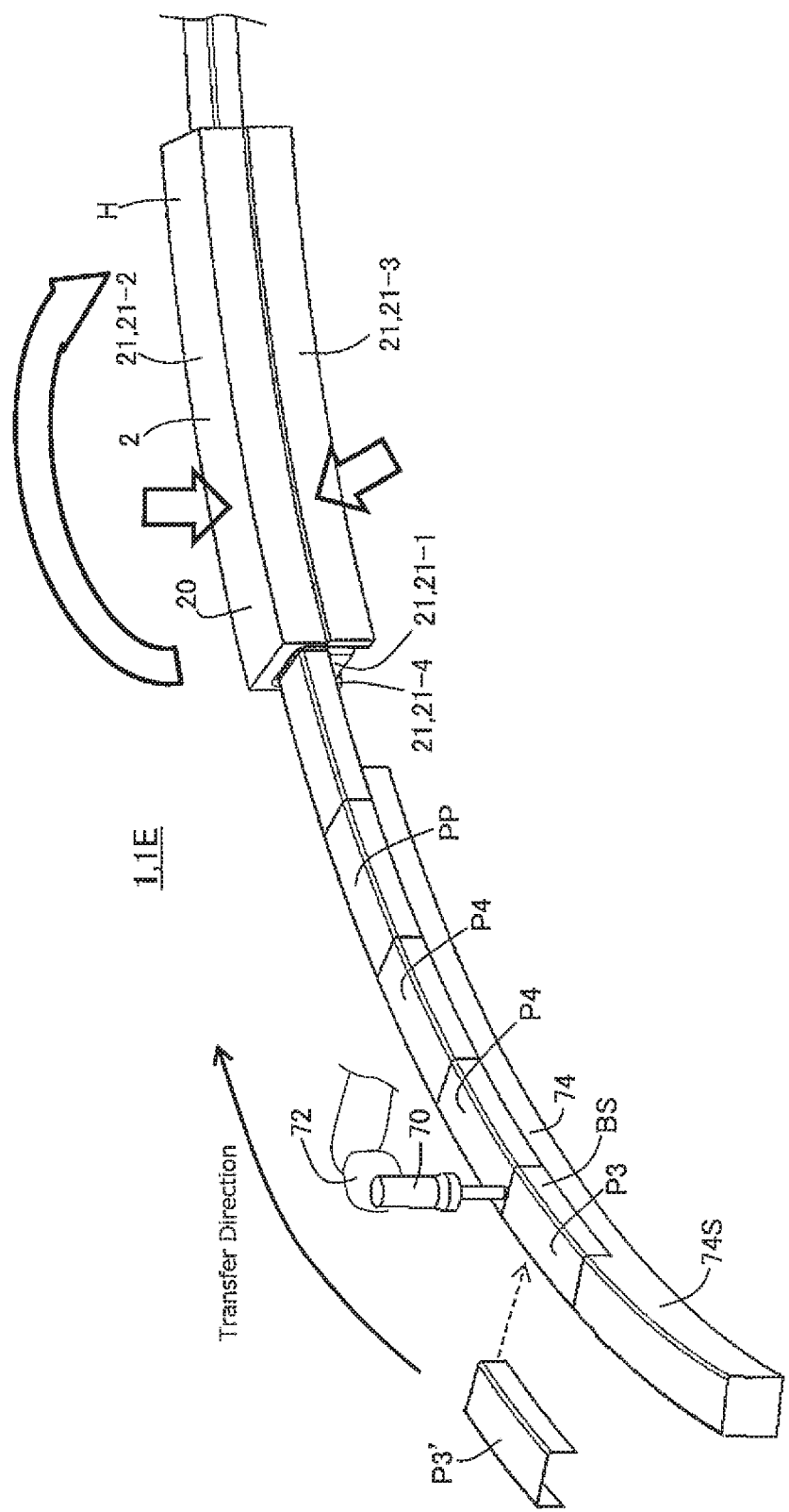
FIG. 14 is a diagram schematically illustrating a composite material component manufacturing device according to a fifth embodiment.

A composite material component and a composite material component manufacturing device 1E according to the fifth embodiment will be described with reference to FIG. 12 to FIG. 14. FIG. 12 is a diagram schematically illustrating a state of molding a cut prepreg sheet P2. FIG. 13 is a diagram schematically illustrating a state of molding the cut prepreg sheet P2. FIG. 14 is a diagram schematically illustrating a composite material component manufacturing device 1E according to the fifth embodiment. In FIG. 14, in order to avoid complication of the drawings, the configuration of the composite material component manufacturing device 1E is described in a simplified manner.

The composite material component manufacturing method and the composite material component manufacturing device 1E according to the fifth embodiment are combinations of portions of the composite material component manufacturing method and the composite material component manufacturing device 1B according to the second embodiment and portions of the composite material component manufacturing method and the composite material component manufacturing device 1D according to the fourth embodiment. Accordingly, in the fifth embodiment, points that differ from the second embodiment and the fourth embodiment will be primarily described, and redundant descriptions of the features described in the second embodiment and the fourth embodiment are omitted.

(Method of Preparing Laminate Body P4 of Molded Prepreg Sheet P3 and Another Prepreg Sheet P3')

An example of a method of preparing a laminate body P4 with the molded prepreg sheet P3 and another prepreg sheet P3' will be described with reference to FIG. 4, FIG. 12, and FIG. 13.

Since Step ST101 is similar to Step ST101 according to the second embodiment, the explanation thereof is omitted.

In Step ST102, the prepreg sheet P2 is thermoformed into a three-dimensional shape. The three-dimensional shape is, for example, a shape having at least one bent portion. In this instance, Step ST102 includes a bending process.

In the example illustrated in FIG. 12, the prepreg sheet P2 is thermoformed into a three-dimensional shape by using a molding device 60 (a hot press device 60-1). More specifically, the prepreg sheet P2 is placed on a support member 61. Next, the prepreg sheet P2 is pressed by the hot press device 60-1; more specifically, the prepreg sheet P2 is sandwiched between the hot press device 60-1 and the support member 61, thereby bending the prepreg sheet P2. As a result, a prepreg sheet P3 thermoformed into a three-dimensional shape (a prepreg sheet P3 that has undergone bend processing) is obtained.

In the example illustrated in FIG. 12, the prepreg sheet P3 has a curved surface BS (for example, a circular arc surface). More specifically, the prepreg sheet P3 has two curved surfaces BS facing each other.

In the example illustrated in FIG. 12, Step ST102 is performed using the hot press device 60-1. The hot press device 60-1 may be a mold member as illustrated in FIG. 12. Alternatively, the thermoforming device for performing Step ST102 may be a device for pressing the prepreg sheet P2 along the surfaces of the support members 61 using a film or the like while heating the prepreg sheet P2 with heaters or the like. Still alternatively, as illustrated in FIG. 13, Step ST102 may be performed using other thermoforming devices 60-2, such as soldering irons, ultrasonic heating devices (ultrasonic welding devices), heat rolls, or the like.

In Step ST103, the molded prepreg sheet P3 and another prepreg sheet P3' are layered. In the example illustrated in FIG. 14, the another prepreg sheet P3' is also a prepreg sheet produced by using the above-described molding process (Step ST102), similarly to the prepreg sheet P3.

In the example illustrated in FIG. 14, the another prepreg sheet P3' is placed on the prepreg sheet P3, thereby forming the laminate body P4. The prepreg sheet P3 and the prepreg sheet P3' (that is, the laminate body P4) are preferably temporarily fixed (for example, partially welded) by an arbitrary welding device 70 such as a soldering iron or an ultrasonic heating device (ultrasonic welding device).

In Step ST104, a plurality of laminate bodies P4 are connected along the prepreg transfer direction. In the example illustrated in FIG. 14, a plurality of laminate bodies P4 are arranged along the prepreg transform direction, and adjacent laminate bodies P4 are connected to each other by an arbitrary welding device 70 such as a soldering iron, an ultrasonic heating device (ultrasonic welding device), or the like. By connecting the plurality of laminate bodies P4, a continuous, elongated prepreg PP is produced.

It should be noted that Step ST104 may be executed separately from Step ST103, or may be executed simultaneously with Step ST103.

Steps ST103 and ST104 may be performed manually or automatically mechanically. When performing automation, for example, a welding apparatus 70 such as a soldering iron or an ultrasonic heating device may be mounted on a welding device moving device 72 (for example, a robot arm). In other words, the composite material component manufacturing device 1B may include a welding device 70 and a welding device moving device 72 that connect neighboring laminate bodies P4.

In the fifth embodiment, the steps after Step ST104 may be the same as that of the fourth embodiment. That is, the first to fourth steps ST1 to ST4 in the first embodiment may be executed after Step ST104. Alternatively, Steps ST103 and ST104, and the first to fourth steps ST1 to ST4 may be executed in parallel.

The first to fourth steps ST1 to ST4 in the fifth embodiment may be performed using the composite material component manufacturing device 1D according to the fourth embodiment. In other words, the pressing device 20 and the transfer device 2 according to the fifth embodiment may be the same as the pressing device 20 and the transfer device 2 according to the fourth embodiment.

The fifth embodiment has the same effects as the second embodiment and the fourth embodiment.

It should be noted that in the example illustrated in FIG. 14, Step ST104 (a step of connecting a plurality of laminate bodies P4) is performed on the rail member 74. That is, in a state in which the plurality of laminate bodies P4 are mounted on the rail member 74, the step of connecting the plurality of laminate bodies P4 by the welding device 70 is performed.

In addition, in the example illustrated in FIG. 14, when the second step ST2 (the step of transferring the prepreg PP) is performed, the prepreg PP, that is, the connected laminate bodies P4, slide on the rail member 74. That is, the rail member 74 has a curved shape and functions as a guide member that defines the moving direction of the connected laminate bodies P4. The rail member 74 has a curved surface 74S corresponding to the curved surface BS of the prepreg sheet P3. The rail member 74 may be made of metal or plastic.

It should be noted that, in the fifth embodiment, since the prepreg sheet is thermoformed a plurality of times, it is preferable that the resin of the prepreg in the fifth embodiment is a thermoplastic resin.

Modification of the Fifth Embodiment

In the fifth embodiment, an example has been described in which a prepreg sheet P3 that has been molded into a three-dimensional shape and a prepreg sheet P3' that has been molded into a three-dimensional shape are layered to produce the laminate body P4. Alternatively, the laminate body P4 may be manufactured by layering a prepreg sheet P3 that has been molded into a three-dimensional shape and a prepreg sheet having a two-dimensional shape (planar shape). In other words, the prepreg sheet P3' in the fifth embodiment may be replaced with a prepreg sheet having a two-dimensional shape (a planar shape).

Sixth Embodiment

Figure 15:
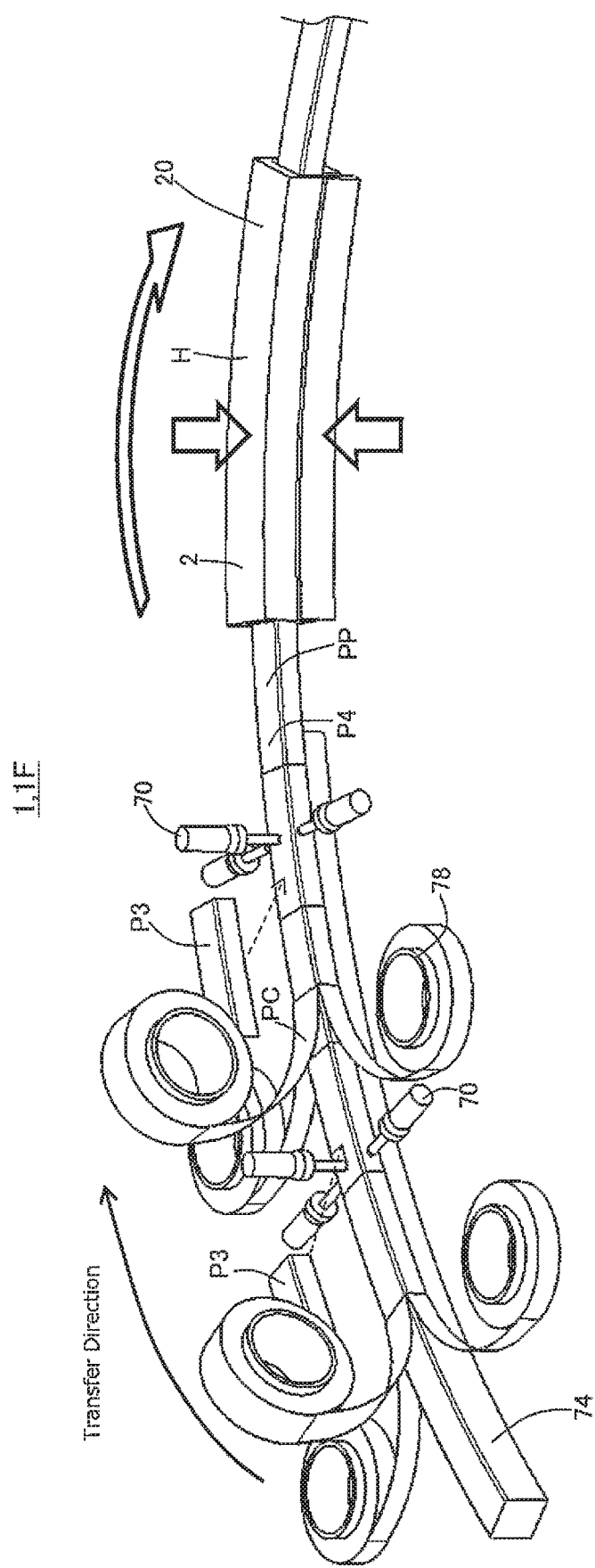
FIG. 15 is a diagram schematically illustrating a composite material component manufacturing device according to a sixth embodiment.

A composite material component manufacturing method and a composite material component manufacturing device 1F according to the sixth embodiment will be described with reference to FIG. 15. FIG. 15 is a diagram schematically illustrating a composite material component manufacturing device according to the sixth embodiment.

The composite material component manufacturing method and the composite material component manufacturing device 1F according to the sixth embodiment differ from the composite material component manufacturing method and the composite material component manufacturing device 1E according to the fifth embodiment in that the composite material component is manufactured using a laminate body P4 formed from a prepreg sheet PC that is continuously fed out and a prepreg sheet P3 which is molded into a three-dimensional shape. Otherwise, the sixth embodiment is similar to the fifth embodiment.

Modification of the Sixth Embodiment

In the sixth embodiment, an example has been described in which a prepreg sheet PC continuously fed out and a prepreg sheet P3 molded into a three-dimensional shape are laminated. Alternatively, in the sixth embodiment, the prepreg sheet P3 that has been molded into a three-dimensional shape need not be used. In this case, the resin of the prepreg PP may be a thermoplastic resin or a thermosetting resin. In addition, the welding device 70 may be omitted.

Seventh Embodiment

Figure 16:
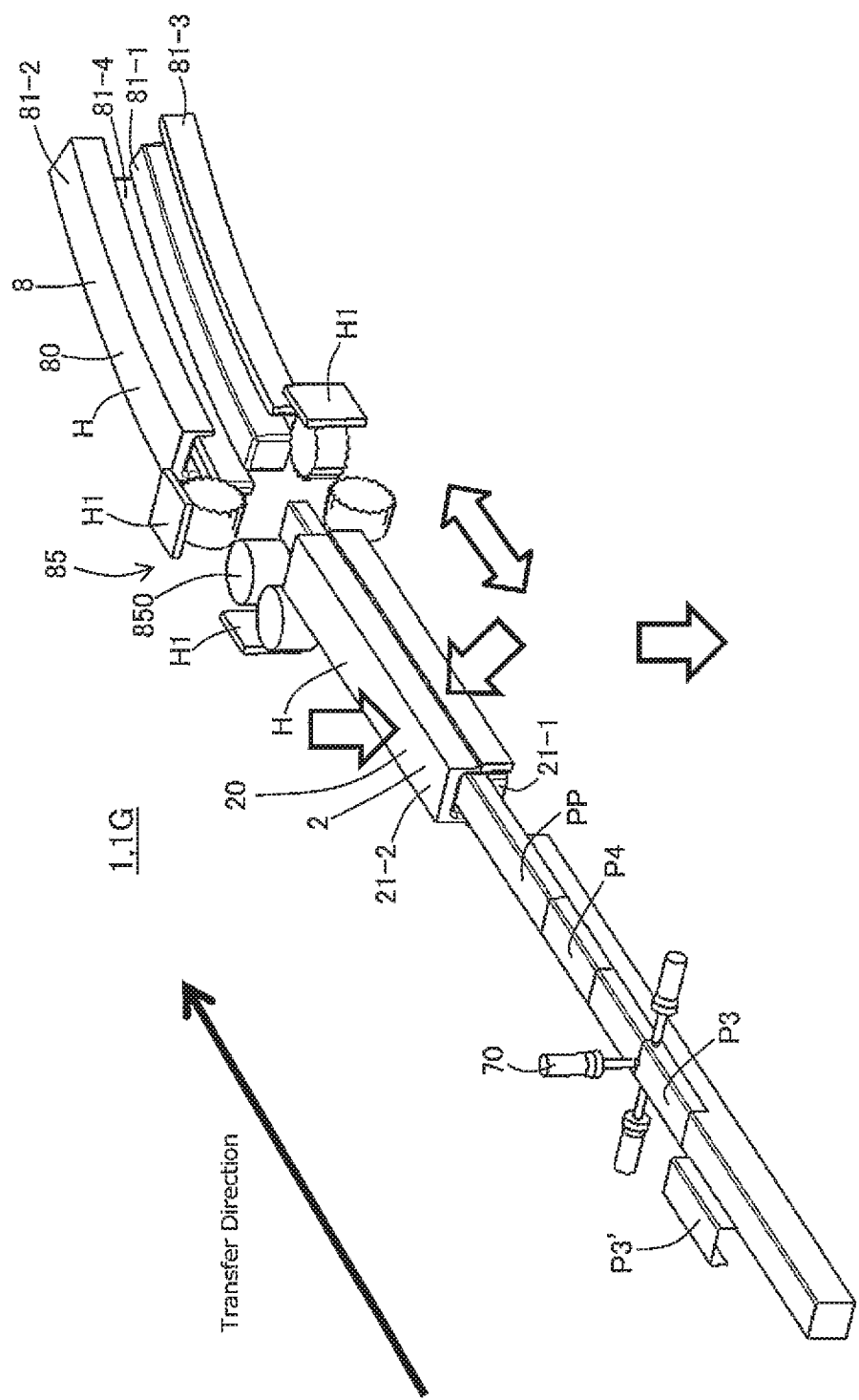
FIG. 16 is a partially exploded perspective view schematically illustrating a composite material component manufacturing device according to a seventh embodiment.
Figure 17:
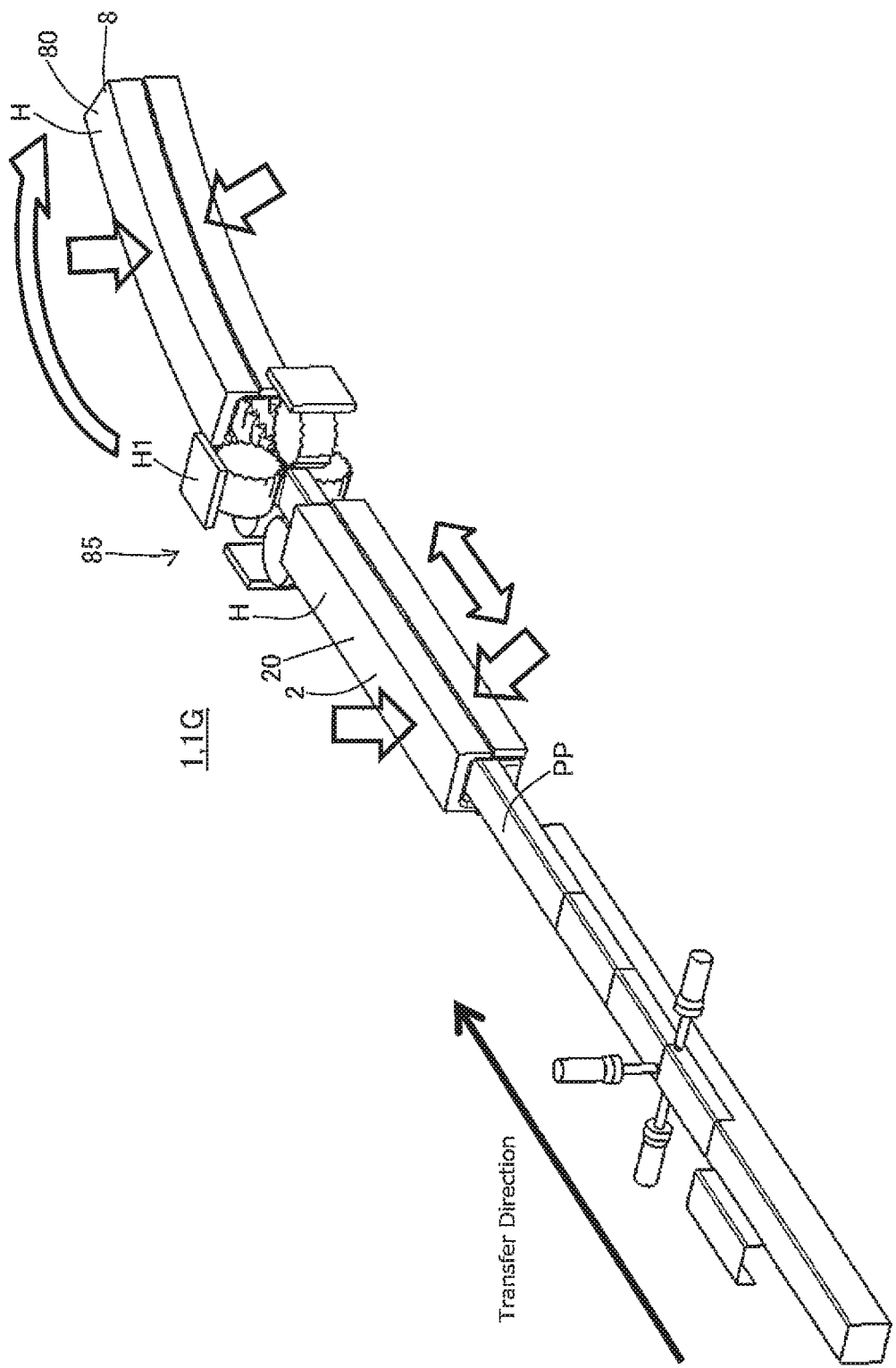
FIG. 17 is a diagram schematically illustrating a composite material component manufacturing device according to the seventh embodiment.
Figure 18:
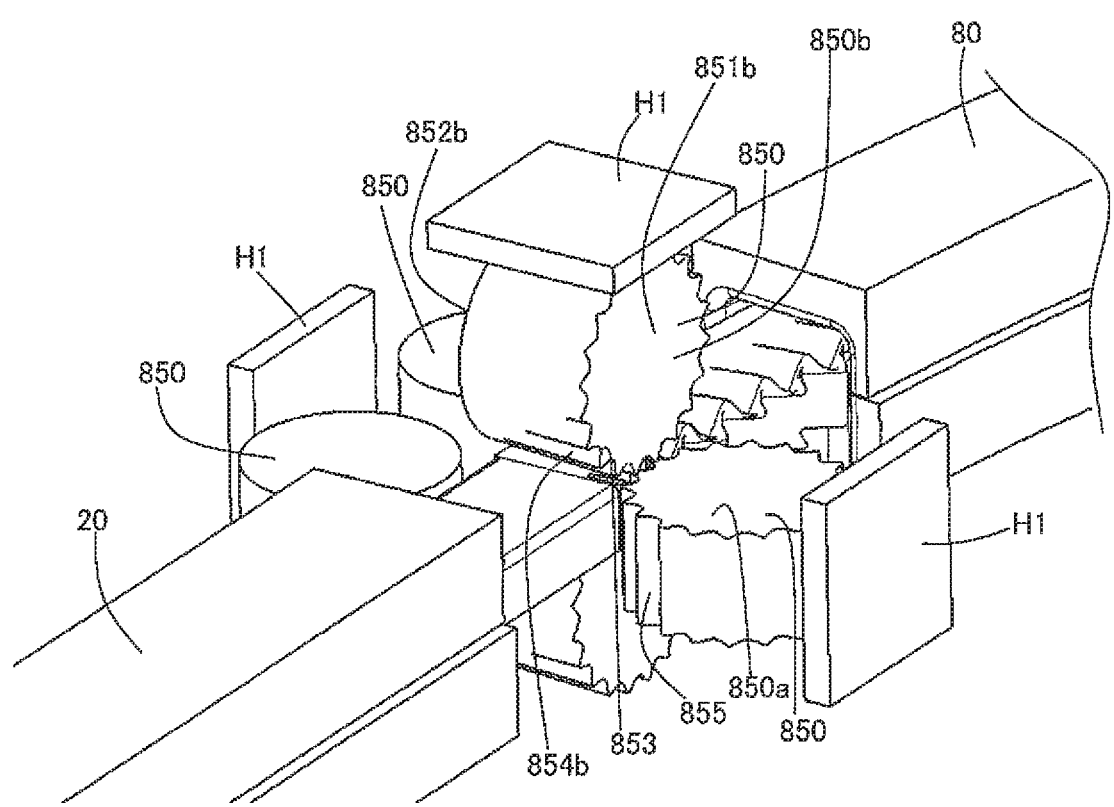
FIG. 18 is a partially enlarged view of the composite material component manufacturing device according to the seventh embodiment.
Figure 19:
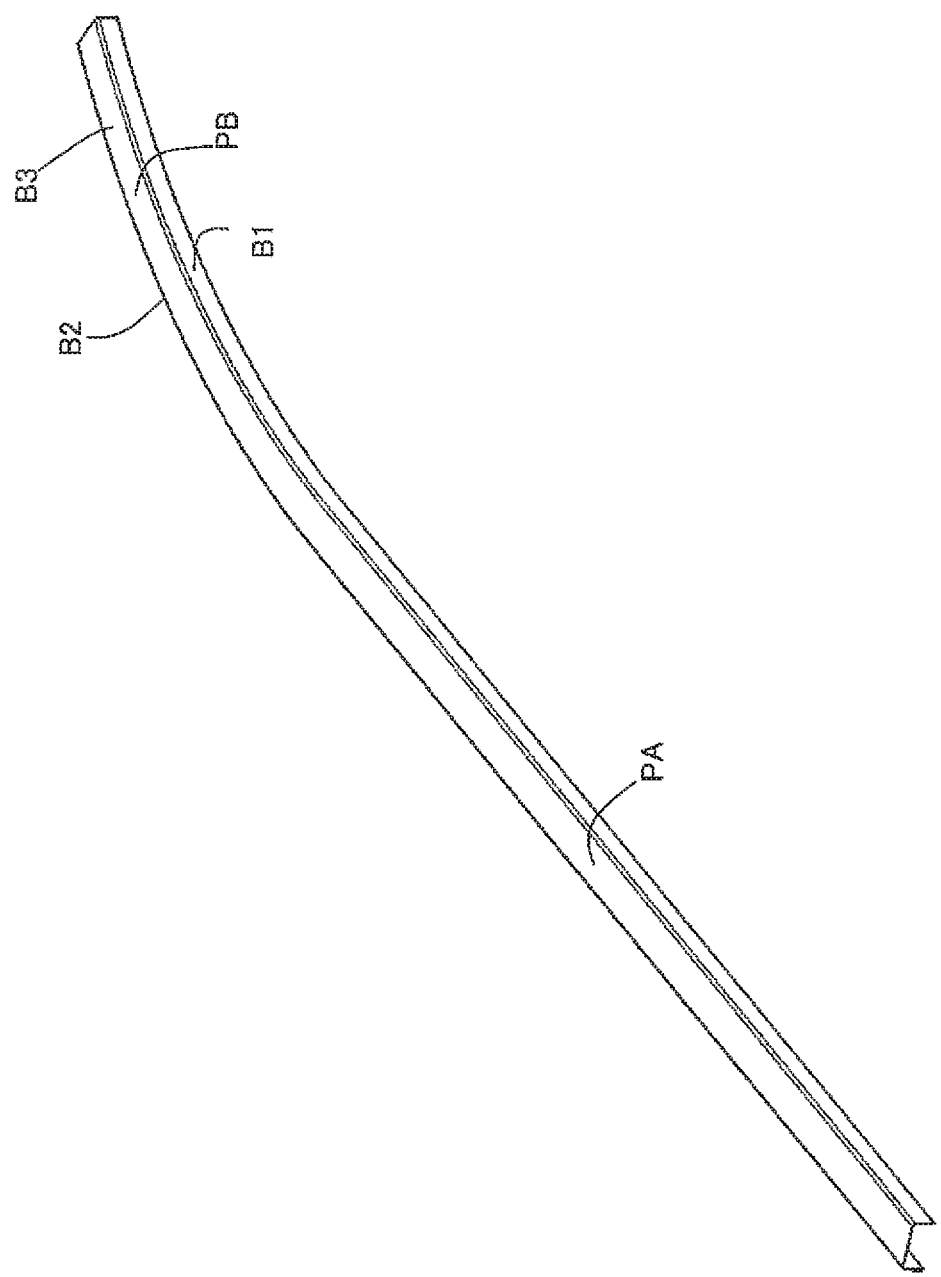
FIG. 19 is a schematic perspective view schematically illustrating an example of a composite material component formed by the composite material component manufacturing method according to the seventh embodiment.

The composite material component manufacturing method and the composite material component manufacturing device 1G according to the seventh embodiment will be described with reference to FIG. 16 to FIG. 19. FIG. 16 is a partially exploded perspective view schematically illustrating a composite material component manufacturing device 1G according to the seventh embodiment. FIG. 17 is a diagram schematically illustrating a composite material component manufacturing device 1G according to the seventh embodiment. FIG. 18 is a partially enlarged view of the composite material component manufacturing device 1G according to the seventh embodiment. FIG. 19 is a schematic perspective view schematically illustrating an example of a composite material component formed by the composite material component manufacturing method according to the seventh embodiment. It should be noted that, in FIG. 16 to 18, in order to avoid complication of the drawings, the configuration of the composite material component manufacturing device 1G is described in a simplified manner.

In the composite material component manufacturing method according to the seventh embodiment, the composite material component manufacturing method according to the first embodiment, the second embodiment, or the third embodiment is combined with the molding performed by the second pressing device 80. Accordingly, in the seventh embodiment, the description will primarily focus on those points that differ from the first embodiment, the second embodiment, and the third embodiment, and redundant descriptions of the features described in the first embodiment, the second embodiment, and the third embodiment will be omitted.

In the seventh embodiment, heat and a pressing force are applied to the prepreg PP by the pressing device 20, and a first molded portion PA (see FIG. 19) is manufactured. In addition, heat and a pressing force are applied to the prepreg PP by the second pressing device 80, whereby a second molded portion PB (see FIG. 19) is manufactured.

In the seventh embodiment, the pressing device 20 and the transfer device 2 that moves the pressing device 20 together with the prepreg PP are the same as the pressing device 20 and the transfer device 2 in the first embodiment. The prepreg PP softened by the pressing device 20 is linearly transported in a state in which pressing force is applied by the pressing device 20.

The second pressing device 80 is, for example, the same pressing device as the pressing device 20 according to the fourth embodiment (for example, the pressing device 20 illustrated in FIG. 10A or FIG. 11A). In addition, the transfer of the material softened by the second pressing device 80 (the prepreg PP) is performed, for example, by the same transfer device as the transfer device 2 (for example, the transfer device 2 illustrated in FIG. 11A) in the fourth embodiment. It should be noted that, in FIG. 16, the second transfer device 8 corresponds to the transfer device 2 illustrated in FIG. 11A. In addition, the first pressing member 81-1 and the second pressing member 81-2 correspond to the first pressing member 21-1 and the second pressing member 21-2 illustrated in FIG. 11B, respectively. In addition, the third pressing member 81-3 and the fourth pressing member 81-4 correspond to the third pressing member 21-3 and the fourth pressing member 21-4 illustrated in FIG. 11B, respectively.

In the seventh embodiment, the portion (the prepreg PP) softened by the second pressing device 80 is transferred along a curve in a state in which a pressing force is applied by the second pressing device 80.

In other words, in the seventh embodiment, in the step of transferring the prepreg PP, the first portion (the first molded portion PA) of the prepreg PP moves together with the pressing device 20 in a state in which a pressing force is applied by the pressing device 20, and the second portion (the second molded portion PB) of the prepreg PP moves together with the second pressing device 80 in a state in which a pressing force is applied by the second pressing device 80. The transfer of the prepreg PP using the transfer device 2 and the transfer of the prepreg PP using the second transfer device 8 may be performed simultaneously or at different timings.

It should be noted that, in the seventh embodiment, the curvature (a curvature of zero) of the movement trajectory of the pressing device 20 in the transfer process and the curvature of the movement trajectory of the second pressing device 80 in the transfer process are different from each other. Accordingly, there is a possibility that a prepreg PP that has passed through the pressing device 20 is not smoothly introduced into the second pressing device 80. Therefore, in the examples illustrated in FIG. 16 and FIG. 17, a preheating device 85 is disposed between the pressing device 20 and the second pressing device 80.

The preheating device 85 is a device (a softening device) that heats the prepreg PP to a temperature less than or equal to its melting point and preheats a prepreg PP located on the downstream side of the pressing device 20 and the upstream side of the second pressing device 80. The preheating device 85 includes a heater H1. As the prepreg PP is softened by heating, the softened prepreg PP is smoothly introduced into the second pressing device 80.

Referring to FIG. 19, the second molded portion PB has an inner surface B1 having a relatively small radius of curvature and an outer surface B2 having a relatively large radius of curvature. Accordingly, wrinkles may occur on the inner surface B1 at the time of molding. Therefore, in the example illustrated in FIG. 18, an uneven portion 855 is formed on the surface of the feed roller 850 of the preheating device 85. That is, at least one of the plurality of feed rollers 850 is an uneven roller 850a. The uneven roller 850a imparts unevenness to the inner surface of the prepreg PP, so that the fibers in the prepreg PP have a zigzag shape. As a result, since the apparent length of the fiber is shortened, wrinkles are less likely to occur on the inner surface of the prepreg PP when the prepreg PP is molded by the second pressing device 80.

Referring to FIG. 19, wrinkles may also occur in the inner region of the top surface B3 of the second molded portion PB. Accordingly, in the example illustrated in FIG. 18, a tapered uneven portion 853 is formed on the surface of the feed roller 850 of the preheating device 85. That is, at least one of the plurality of feed rollers 850 is a tapered uneven roller 850b. In the example illustrated in FIG. 18, the depth of the uneven portion 854b becomes gradually shallower from one end surface 851b of the roller 850b toward the other end surface 852b of the roller 850b. By using a tapered uneven roller 850b, it is possible to impart unevenness to one side of the top surface of the prepreg PP. In this way, since the apparent length of the fiber is shortened in the inner region of the top surface of the prepreg PP, wrinkles are less likely to occur in the inner region of the top surface of the prepreg PP when the prepreg PP is molded by the second pressing device 80.

The seventh embodiment has the same effects as the first embodiment and the fourth embodiment. In addition, in the seventh embodiment, it is possible to manufacture a composite material component having a straight first molded portion PA and a curved second molded portion PB.

In the seventh embodiment, the first portion of the prepreg (the portion which is sandwiched by the pressing device 20) moves together with the pressing device 20 while a pressing force is applied by the pressing device 20. In addition, the second portion of the prepreg, (the portion which is sandwiched by the second pressing device 80) moves together with the second pressing device 80 in a state in which a pressing force is applied by the second pressing device 80. Accordingly, when the prepreg PP is transferred, tension does not act on the portion softened by the pressing device 20 or the second pressing device 80.

It should be noted that in the seventh embodiment, since the prepreg sheet is thermoformed a plurality of times, it is preferable that the resin of the prepreg in the seventh embodiment is a thermoplastic resin.

Eighth Embodiment

Figure 20:
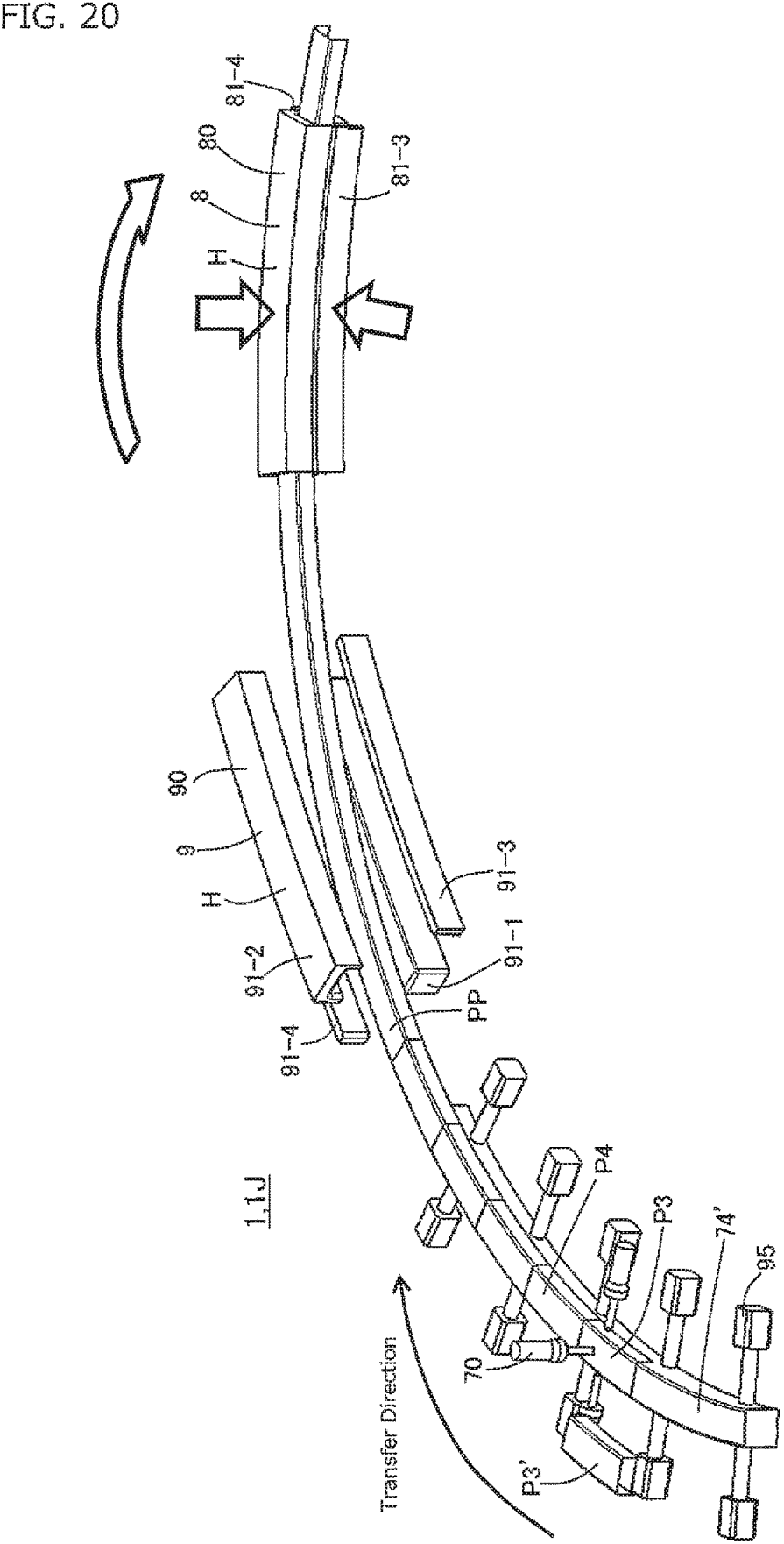
FIG. 20 is a partially exploded perspective view schematically illustrating a composite material component manufacturing device according to the eighth embodiment.
Figure 21:
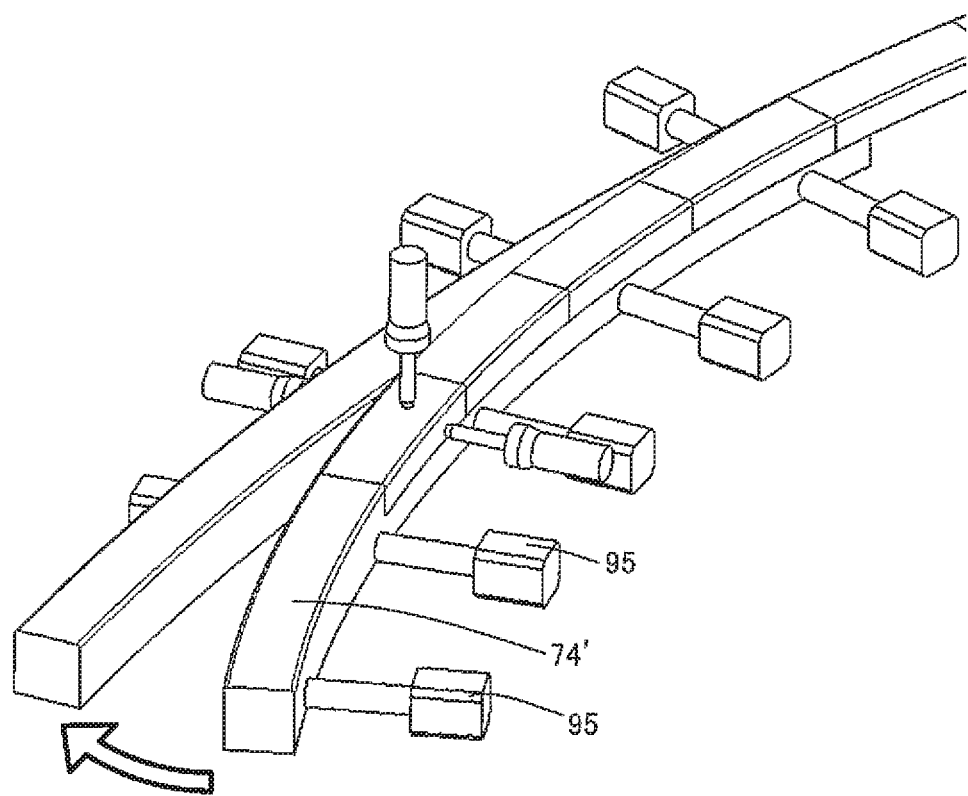
FIG. 21 is a partially enlarged view of the composite material component manufacturing device according to the eighth embodiment.
Figure 22:
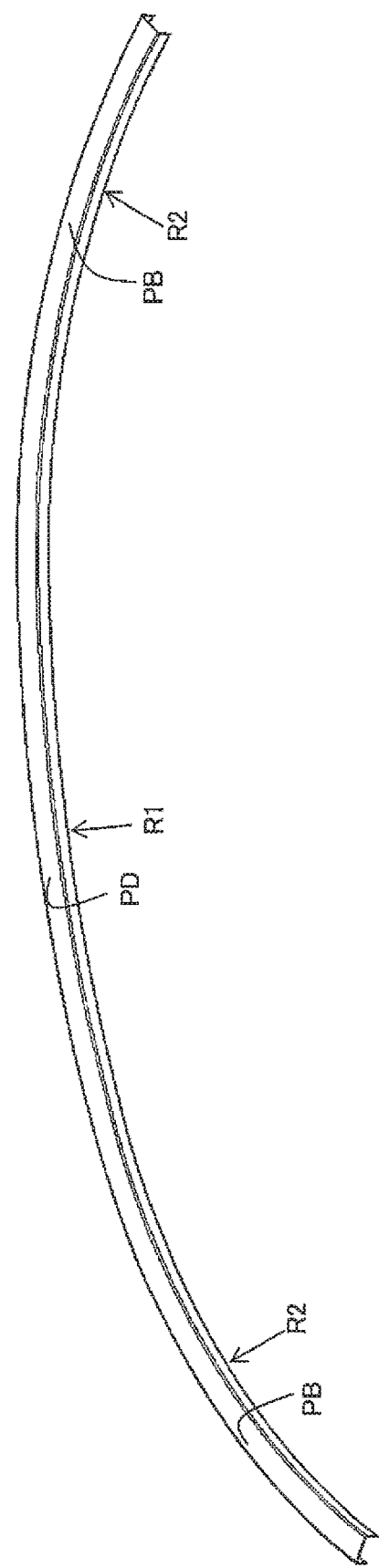
FIG. 22 is a schematic perspective view schematically illustrating an example of a composite material component formed by the composite material component manufacturing method according to the eighth embodiment.

The composite material component manufacturing method and the composite material component manufacturing device 1J according to the eighth embodiment will be described with reference to FIG. 20 to FIG. 22. FIG. 20 is a partially exploded perspective view schematically illustrating a composite material component manufacturing device 1J according to the eighth embodiment. FIG. 21 is a partially enlarged view of the composite material component manufacturing device 1J according to the eighth embodiment. FIG. 22 is a schematic perspective view schematically illustrating an example of a composite material component formed by the composite material component manufacturing method according to the eighth embodiment.

In the composite material component manufacturing device 1J according to the eighth embodiment, the pressing device 20 and the transfer device 2 according to the seventh embodiment are replaced by a pressing device 90 and a transfer device 9. In the eighth embodiment, the rail member 74' on the upstream side of the pressing device 90 is a deformable rail member. Otherwise, the composite material component manufacturing device 1J according to the eighth embodiment is the same as the composite material component manufacturing device 1G according to the seventh embodiment. Accordingly, in the eighth embodiment, the description will focus on the points that differ from the seventh embodiment, and redundant descriptions for the features already described in the seventh embodiment will be omitted.

In the eighth embodiment, heat and a pressing force are applied to the prepreg PP by the pressing device 90, and the first molded portion PD (see FIG. 22) is manufactured. In addition, heat and a pressing force are applied to the prepreg PP by the second pressing device 80, whereby the second molded portion PB (see FIG. 22) is manufactured.

In the eighth embodiment, the pressing device 90 is, for example, the same pressing device as the pressing device 20 according to the fourth embodiment (for example, the pressing device 20 illustrated in FIG. 11A). In addition, the transfer of the portion (the prepreg PP) softened by the pressing device 90 is performed by, for example, a transfer device similar to the transfer device 2 (for example, the transfer device 2 illustrated in FIG. 11A) according to the fourth embodiment. It should be noted that in FIG. 20, the transfer device 9 corresponds to the transfer device 2 illustrated in FIG. 11A. In addition, the first pressing member 91-1 and the second pressing member 91-2 correspond to the first pressing member 21-1 and the second pressing member 21-2 illustrated in FIG. 11B, respectively. The third pressing member 91-3 and the fourth pressing member 91-4 correspond to the third pressing member 21-3 and the fourth pressing member 21-4 illustrated in FIG. 11B, respectively.

The portion (the prepreg PP) softened by the pressing device 90 is transferred along a curve in a state where a pressing force is applied by the pressing device 90.

The second pressing device 80 and the second transfer device 8 according to the eighth embodiment are the same as the second pressing device 80 and the second transfer device 8 according to the seventh embodiment. It should be noted that, in the eighth embodiment, the curvature of the pressing surface of the third pressing member 81-3 that constitutes a portion of the second pressing device 80 is different from the curvature of the pressing surface of the third pressing member 91-3 that constitutes a part of the pressing device 90. Similarly, the curvature of the pressing surface of the fourth pressing member 81-4 is different from the curvature of the pressing surface of the fourth pressing member 91-4.

In the eighth embodiment, the portion (the prepreg PP) softened by the second pressing device 80 is transferred along a curve while a pressing force is applied by the second pressing device 80.

In other words, in the eighth embodiment, in the step of transferring the prepreg PP, the first portion (the first molding portion PD) of the prepreg PP moves together with the pressing device 90 in a state in which a pressing force is applied by the pressing device 90, and the second portion (the second molding portion PB) of the prepreg PP moves together with the second pressing device 80 in a state in which a pressing force is applied by the second pressing device 80. The transfer of the prepreg PP using the transfer device 9 and the transfer of the prepreg PP using the second transfer device 8 may be performed simultaneously or at different timings.

In the eighth embodiment, the curvature of the movement trajectory of the pressing device 90 in the transfer process and the curvature of the movement trajectory of the second pressing device 80 in the transfer process are different from each other. Accordingly, there is a possibility that a prepreg PP that has passed through the pressing device 90 is not smoothly introduced into the second pressing device 80. Accordingly, in the eighth embodiment as well, similar to the seventh embodiment, a preheating device may be disposed between the pressing device 90 and the second pressing device 80. The configuration of the preheating device may be the same as that of the preheating device 85 according to the seventh embodiment.

The eighth embodiment achieves the same effects as those of the seventh embodiment. In addition, in the eighth embodiment, it is possible to manufacture a composite material component having a curved first molded portion PD and a curved second molded portion PB that has a curvature different from that of the first molded portion PD. For example, in the example illustrated in FIG. 22, the radius of curvature R1 of the first molded portion PD is larger than the radius of curvature R2 of the second molded portion PB. The radius of curvature R1 is, for example, greater than or equal to 1,000 mm and less than or equal to 200,000 mm. The radius of curvature R2 is, for example, greater than or equal to 1,000 mm and less than or equal to 200,000 mm.

In the eighth embodiment, the first portion of the prepreg (the portion which is sandwiched by the pressing device 90) moves together with the pressing device 90 while a pressing force is applied by the pressing device 90. In addition, the second portion of the prepreg (the portion which is sandwiched by the second pressing device 80) moves together with the second pressing device 80 in a state in which a pressing force is applied by the second pressing device 80. Accordingly, when the prepreg PP is transferred, tension does not act on the portion softened by the pressing device 90 or the second pressing device 80.

It should be noted that, as illustrated in FIG. 20 and FIG. 21, the rail member 74' on the upstream side of the pressing device 90 may be a deformable rail member. For example, the rail member 74' may be deformed using a plurality of actuators 95. When a prepreg sheet corresponding to the first molded portion PD molded by the pressing device 90 is supplied, the curvature of the rail member 74' is set to the curvature of the first molded portion PD. When a prepreg sheet corresponding to the second molded portion PB molded by the second pressing device 80 is supplied, the curvature of the rail member 74' is set to the curvature of the second molded portion PB.

It should be noted that, in the eighth embodiment, since the prepreg sheet is thermoformed a plurality of times, it is preferable that the resin of the prepreg in the eighth embodiment is a thermoplastic resin.

(Composite Material Component Manufacturing System)

Figure 23:
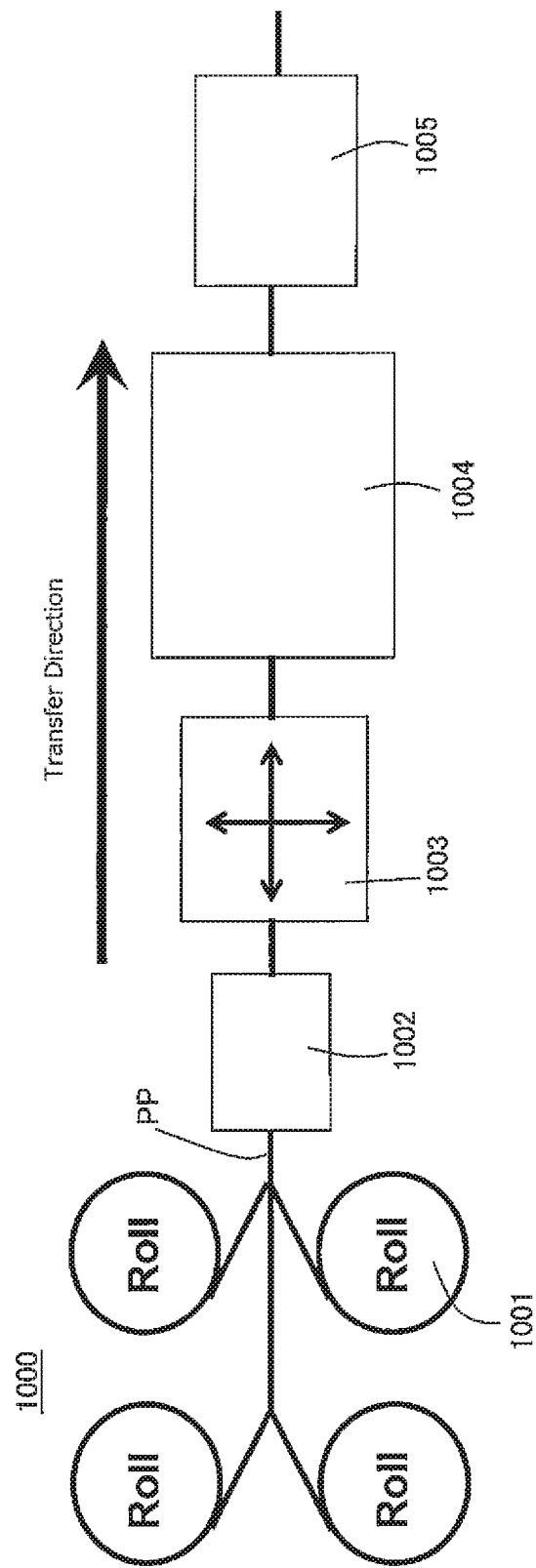
FIG. 23 is a conceptual diagram schematically illustrating a composite material manufacturing system according to an embodiment.

An example of a composite material component manufacturing system 1000 that utilizes the composite material component manufacturing device 1 according to embodiments will be described with reference to FIG. 23. FIG. 23 is a conceptual diagram schematically illustrating a composite material component manufacturing system 1000.

The composite material component manufacturing system 1000 includes a prepreg supply apparatus 1001, a pre-molding device 1002, a mold transfer apparatus 1003, a post-curing device 1004, and a cutting device 1005.

Figure 24:
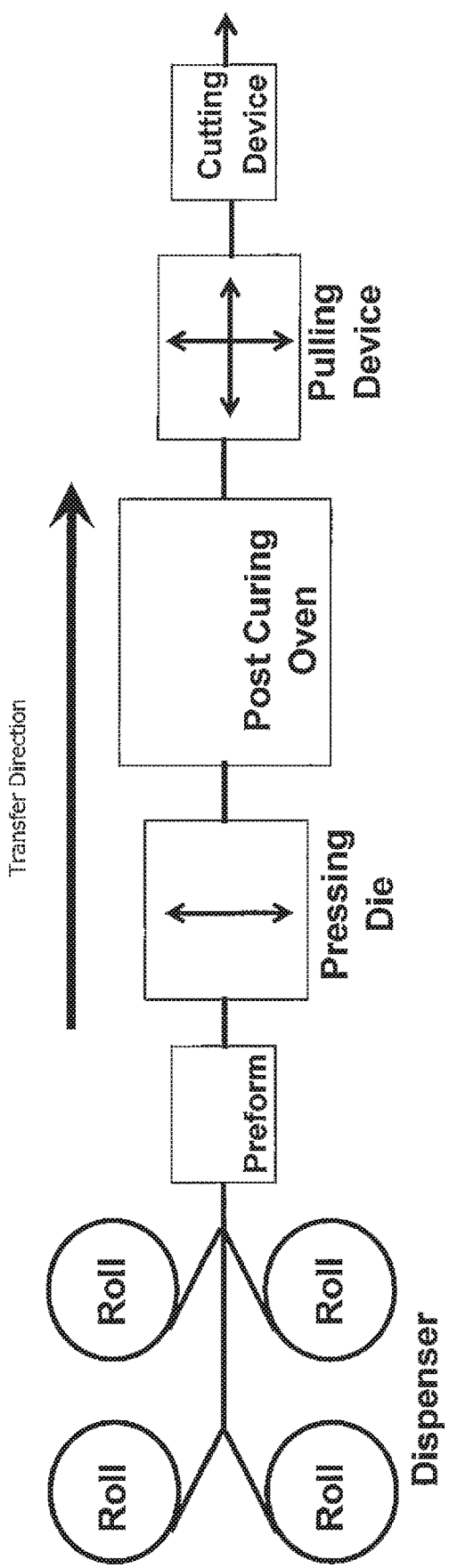
FIG. 24 is a conceptual diagram schematically illustrating a composite material manufacturing system according to a comparative example.

The supply device 1001 supplies the prepreg PP. The pre-molding device 1002 is a device for mechanically molding the prepreg PP, but the pre-molding device 1002 may be omitted. The mold transfer device 1003 is a device corresponding to the pressing device (20; 80; 90) and the transfer device (2; 8; 9) according to embodiments. The post-curing device 1004 is a device that accelerates thermal curing of the resin by heating the prepreg after molding. It should be noted that the post-curing device 1004 may be omitted. The cutting device 1005 is a device that cuts the manufactured composite material components into predetermined dimensions. In the comparative embodiment illustrated in FIG. 24, a pulling device intermittently transfers the prepregs PP. As a result, tension is exerted on the portions softened by the pressing device (pressing die) during the transfer of the prepreg. On the other hand, in embodiments, the prepreg is transported in a state in which the pressing device (the mold transfer device 1003) presses the prepreg. Accordingly, tension is not applied to the portions softened by the pressing device.

(1) In embodiments, tension is not applied to the portions softened by the pressing device. Accordingly, it is possible to manufacture the composite material components regardless of the type of the fiber and the type of the resin. Continuous molding of elongated composite material components is also possible.

(2) In embodiments, the transfer device transfers the prepreg via a pressing device. In addition, the pressing device sequentially thermoforms the prepregs that will be transferred. Accordingly, it is not necessary to increase the size of the manufacturing facility in accordance with the size of the prepreg. In other words, in embodiments, it is possible to produce elongated composite material components without large equipment.

(3) In some embodiments, each prepreg is processed into a three-dimensional shape prior to forming a prepreg laminate body. Then, the prepregs that have been processed into a three-dimensional shape are layered with the other prepregs. Accordingly, as compared with the case where the laminate body is processed into a three-dimensional shape, wrinkles are less likely to occur. In addition, when a hard prepreg such as a prepreg containing a thermoplastic resin is used, a large load is applied to the roller when the laminate body is pre-molded (preformed) by a roller or the like, and the prepreg tends to move erratically. On the other hand, in cases in which each prepreg is processed into a three-dimensional shape before the prepreg laminate body is formed, the pre-molding by the roller can be omitted (or partially omitted), and the erratic movement of the prepreg is less likely to occur. Further, in the conventional pulling type molding methods, in cases in which a release film is disposed on the surface of the prepreg, the occurrence of wrinkles and damage to the release film are apt to occur due to a large frictional force between the pre-mold roller and the release film. On the other hand, in embodiments, since it is not necessary to pre-mold the prepreg laminate body, the frictional force between the pre-mold roller and the release film can be reduced. As a result, the generation of wrinkles and damage to the release film are unlikely to occur.

(4) In some embodiments, the pressing device moves along a curved trajectory. For this reason, continuous molding of composite material components with curvature is possible.

Composite material components manufactured according to embodiments include, for example, elongated components for structural members of an aircraft. The cross-sectional shape of the elongated components may be an L-shape, an H-shape, a T-shape, or an Ω (omega) shape in addition to the C-shape described in the above embodiments. The composite material components manufactured according to embodiments may be aircraft interior components formed of a thermoplastic resin. In addition, it is also possible to manufacture small components by cutting the elongated components. Accordingly, the composite material components produced according to embodiments may be small components or components used in devices other than aircraft.

It should be noted that the present invention is not limited to the above-described embodiments. Within the scope of the present invention, it is possible to freely combine the above-described embodiments, to modify any component of each embodiment, or to omit any component in each embodiment.

REFERENCE SIGNS LIST

1, 1A, 1B, 1C, 1D, 1E, 1F, 1G, 1J . . . Composite material component manufacturing device, 2 . . . Transfer device, 8 . . . Second transfer device, 9 . . . Transfer device, 20 . . . Pressing device, 21-1 . . . First pressing device, 21-2 . . . Second pressing device, 21-3 . . . Third pressing device, 21-4 . . . Fourth pressing device, 22 . . . Pressing actuator, 22-1 . . . First actuator, 22-2 . . . Second actuator, 22-3 . . . Third actuator, 22-4 . . . Fourth actuator, 22a . . . Main body portion, 22b . . . Telescopic portion, 24 . . . Frame, 26 . . . Transfer actuator, 26a . . . Main body unit, 26b . . . Telescopic portion, 27 . . . Universal joint, 30 . . . Control device, 40 . . . Base, 42 . . . Bearings, 44 . . . Curved rail member, 46 . . . Sliding member, 60 . . . Molding device, 60-1 . . . Hot press device, 60-2 . . . Thermoforming device, 61 . . . Support member, 70 . . . Welding device, 72 . . . Welding device moving device, 74 . . . Rail member, 74' . . . Rail member, 74S . . . Curved surface, 78 . . . Bobbin, 80 . . . Second pressing device, 81-1 . . . First pressing member, 81-2 . . . Second pressing member, 81-3 . . . Third pressing member, 81-4 . . . Fourth pressing member, 85 . . . Preheating device, 90 . . . Pressing device, 91-1 . . . First pressing member, 91-2 . . . Second pressing member, 91-3 . . . Third pressing member, 91-4 . . . Fourth pressing member, 95 . . . Actuator, 200 . . . Pressing surface, 200-1 . . . First pressing surface, 200-2 . . . Second pressing surface, 850 . . . Feed roller, 850a . . . Uneven roller, 850b . . . Tapered uneven roller, 851b . . . One end surface, 852b . . . Other end surface, 853 . . . Uneven portion, 854b . . . Concave portion, 855 . . . Uneven portion, 1000 . . . Composite material component manufacturing system, 1001 . . . Supply device, 1002 . . . Pre-molding device, 1003 . . . Mold transfer device, 1004 . . . Post-cure device, 1005 . . . Cutting device, B1 . . . Inner surface, B2 . . . Outer surface, B3 . . . Top surface, BS . . . Curved surface, H . . . Heater, H1 . . . Heater, P1 . . . Prepreg, P2 . . . Prepreg sheet, P3 . . . Prepreg Sheet, P3' . . . Prepreg Sheet, P4 . . . Laminate body, PA . . . First molded portion, PB . . . Second molded portion, PD . . . First molded portion, PP . . . Prepreg, Q . . . Bent portion

The invention claimed is:

1. A composite material component manufacturing method comprising:
a molding step of applying, by a pressing device, heat and pressure to a prepreg to mold the prepreg;
a second molding step of applying, by a second pressing device separate from the pressing device, heat and pressure to the prepreg to mold the prepreg, and
a transfer step of transferring the prepreg without applying tension to a portion of the prepreg that has been softened by heat; wherein:

the transfer step includes moving the prepreg together with the pressing device in a state in which a pressing force is applied to a first portion of the prepreg by the pressing device, a moving distance when the pressing device moves together with the prepreg is ½ or less of a pressing surface length of the pressing device, the transfer step further includes moving the prepreg together with the second pressing device in a state in which a pressing force is applied to a second portion of the prepreg by the second pressing device, and a curvature of a movement trajectory of the pressing device in the transfer step and a curvature of a movement trajectory of the second pressing device in the transfer step differ from each other.

2. The composite material component manufacturing method according to claim 1, further comprising:

a step of preheating the prepreg, when the prepreg is located downstream of the pressing device and upstream of the second pressing device.

3. The composite material component manufacturing method according to claim 2, wherein:

the composite material component is an aircraft component or an automobile component.

4. The composite material component manufacturing method according to claim 1, wherein:

when a direction in which the pressing device presses the prepreg is defined as a first direction, a moving direction of the pressing device in the transfer step is a second direction that is perpendicular to the first direction.

5. The composite material component manufacturing method according to claim 4, further comprising:

a step of preheating the prepreg, when the prepreg is located downstream of the pressing device and upstream of the second pressing device.

6. The composite material component manufacturing method according to claim 5, wherein:

the composite material component is an aircraft component or an automobile component.

7. The composite material component manufacturing method according to claim 1, wherein:

a pressing surface of the pressing device includes a curved surface; and the transfer step includes moving the pressing device along a curved trajectory.

8. The composite material component manufacturing method according to claim 7, further comprising:

a step of preheating the prepreg, when the prepreg is located downstream of the pressing device and upstream of the second pressing device.

9. The composite material component manufacturing method according to claim 8, wherein:

the composite material component is an aircraft component or an automobile component.

* * * * *